(12) United States Patent
Astle et al.

(10) Patent No.: US 11,931,679 B2
(45) Date of Patent: *Mar. 19, 2024

(54) FILTER INTERCONNECT UTILIZING A MAGNETIC REPULSION FORCE

(71) Applicant: KX Technologies LLC, West Haven, CT (US)

(72) Inventors: Robert Astle, Middlefield, CT (US); Matthew W. Hartmann, Evansville, IN (US); Garett Strandemo, Evansville, IN (US)

(73) Assignee: KX TECHNOLOGIES LLC, West Haven, CT (US)

( * ) Notice: Subject to any disclaimer, the term of this patent is extended or adjusted under 35 U.S.C. 154(b) by 143 days.

This patent is subject to a terminal disclaimer.

(21) Appl. No.: 17/318,735

(22) Filed: May 12, 2021

(65) Prior Publication Data
US 2021/0260512 A1 Aug. 26, 2021

Related U.S. Application Data

(63) Continuation-in-part of application No. 16/876,594, filed on May 18, 2020.
(Continued)

(51) Int. Cl.
*B01D 35/30* (2006.01)
*B01D 29/11* (2006.01)

(52) U.S. Cl.
CPC ......... *B01D 35/306* (2013.01); *B01D 29/11* (2013.01); *B01D 2201/291* (2013.01);
(Continued)

(58) Field of Classification Search
CPC .............. B01D 35/306; B01D 29/11; B01D 2201/291; B01D 2201/302;
(Continued)

(56) References Cited

U.S. PATENT DOCUMENTS

| 3,420,266 A | 1/1969 | Downey |
| 3,521,216 A | 7/1970 | Tolegian et al. |

(Continued)

FOREIGN PATENT DOCUMENTS

| CN | 204099679 | 1/2015 |
| EP | 2438601 | 3/2017 |

OTHER PUBLICATIONS http://www.polymagnet.com/media/Polymagnet-White-Paper-3-Smart-Magnets-for-Precision-Alignment.

*Primary Examiner* — Madeline Gonzalez
(74) *Attorney, Agent, or Firm* — DeLio Peterson & Curcio LLC; Brian G. Schlosser

(57) ABSTRACT

A filtration system interconnection structure includes a filter manifold and a filter cartridge in magnetic communication produced by two complementary correlated magnets capable of generating a magnetic force when in close proximity to one another. The filter magnet polarity transitions are aligned with the manifold magnet polarity transitions such that a repulsion force is generated between the magnets when the filter cartridge is inserted within the manifold sump. The magnetic repulsion force may be used to move a blocking mechanism or actuate a latch structure in the manifold to secure the filter cartridge within the manifold sump upon insertion, or to provide non-contacting actuation of a downstream valve so as to permit or prevent the flow of fluid. Utilizing correlated magnetism in a filter interconnect further provides enhanced authentication and/or anti-counterfeiting means to ensure that only authorized or OEM filter cartridges can be installed.

13 Claims, 33 Drawing Sheets

Related U.S. Application Data

(60) Provisional application No. 63/023,600, filed on May 12, 2020, provisional application No. 62/849,525, filed on May 17, 2019.

(52) U.S. Cl.
CPC .. *B01D 2201/302* (2013.01); *B01D 2201/305* (2013.01); *B01D 2201/4069* (2013.01); *B01D 2201/4092* (2013.01)

(58) Field of Classification Search
CPC ...... B01D 2201/305; B01D 2201/4069; B01D 2201/4092; B01D 2201/303; B01D 2201/4023; B01D 2201/4053; B01D 35/06; B01D 29/96; H01H 3/16; H01H 36/02
USPC ............................ 210/234, 222, 167.29, 455
See application file for complete search history.

(56) References Cited

U.S. PATENT DOCUMENTS

| | | | |
|---|---|---|---|
| 4,468,321 A | 8/1984 | St. John | |
| 5,527,450 A | 6/1996 | Burrows | |
| 6,003,734 A | 12/1999 | Oh | |
| 7,800,471 B2 | 9/2010 | Fullerton et al. | |
| 7,800,473 B2 | 9/2010 | Fullerton et al. | |
| 7,808,348 B2 | 10/2010 | Fullerton et al. | |
| 7,808,349 B2 | 10/2010 | Fullerton et al. | |
| 7,808,350 B2 | 10/2010 | Fullerton et al. | |
| 7,817,006 B2 | 10/2010 | Fullerton et al. | |
| 7,893,803 B2 | 2/2011 | Fullerton et al. | |
| 8,098,122 B2 | 1/2012 | Fullerton et al. | |
| 8,279,032 B1 | 10/2012 | Fullerton et al. | |
| 8,314,671 B2 | 11/2012 | Fullerton et al. | |
| 8,314,672 B2 | 11/2012 | Fullerton et al. | |
| 8,461,952 B1 | 6/2013 | Fullerton et al. | |
| 8,570,129 B2 | 10/2013 | Fullerton | |
| 8,760,252 B2 | 6/2014 | Fullerton et al. | |
| 8,872,608 B2 | 10/2014 | Fullerton et al. | |
| 8,963,668 B2 | 2/2015 | Fullerton et al. | |
| 9,233,322 B1 | 1/2016 | Huda | |
| 10,129,667 B2 | 11/2018 | Gustafsson | |
| 10,173,292 B2 | 1/2019 | Fullerton et al. | |
| 11,326,379 B2 * | 5/2022 | Astle | H01F 7/0242 |
| 2003/0042191 A1 | 3/2003 | Nam et al. | |
| 2008/0179236 A1 * | 7/2008 | Wieczorek | F02M 37/42 210/235 |
| 2010/0140521 A1 | 6/2010 | Burgess et al. | |
| 2010/0212259 A1 | 8/2010 | Knieling et al. | |
| 2010/0264078 A1 | 10/2010 | Bassett | |
| 2011/0114862 A1 | 5/2011 | Zimmerman et al. | |
| 2012/0229241 A1 | 9/2012 | Fullerton et al. | |
| 2013/0068673 A1 | 3/2013 | Maggiore et al. | |
| 2013/0240431 A1 | 9/2013 | Foix et al. | |
| 2016/0194229 A1 | 7/2016 | Mehdi | |
| 2017/0072347 A1 | 3/2017 | Schmoll | |
| 2017/0259196 A1 | 9/2017 | Foix et al. | |
| 2018/0111129 A1 | 4/2018 | Adey et al. | |
| 2018/0221795 A1 | 8/2018 | Bonifas et al. | |
| 2018/0245429 A1 | 8/2018 | Bhadbhade | |
| 2019/0039005 A1 | 2/2019 | Suthar et al. | |
| 2019/0351352 A1 | 11/2019 | Chandra et al. | |
| 2019/0351354 A1 | 11/2019 | Chandra et al. | |
| 2020/0001211 A1 * | 1/2020 | Li | B01D 35/1573 |

\* cited by examiner

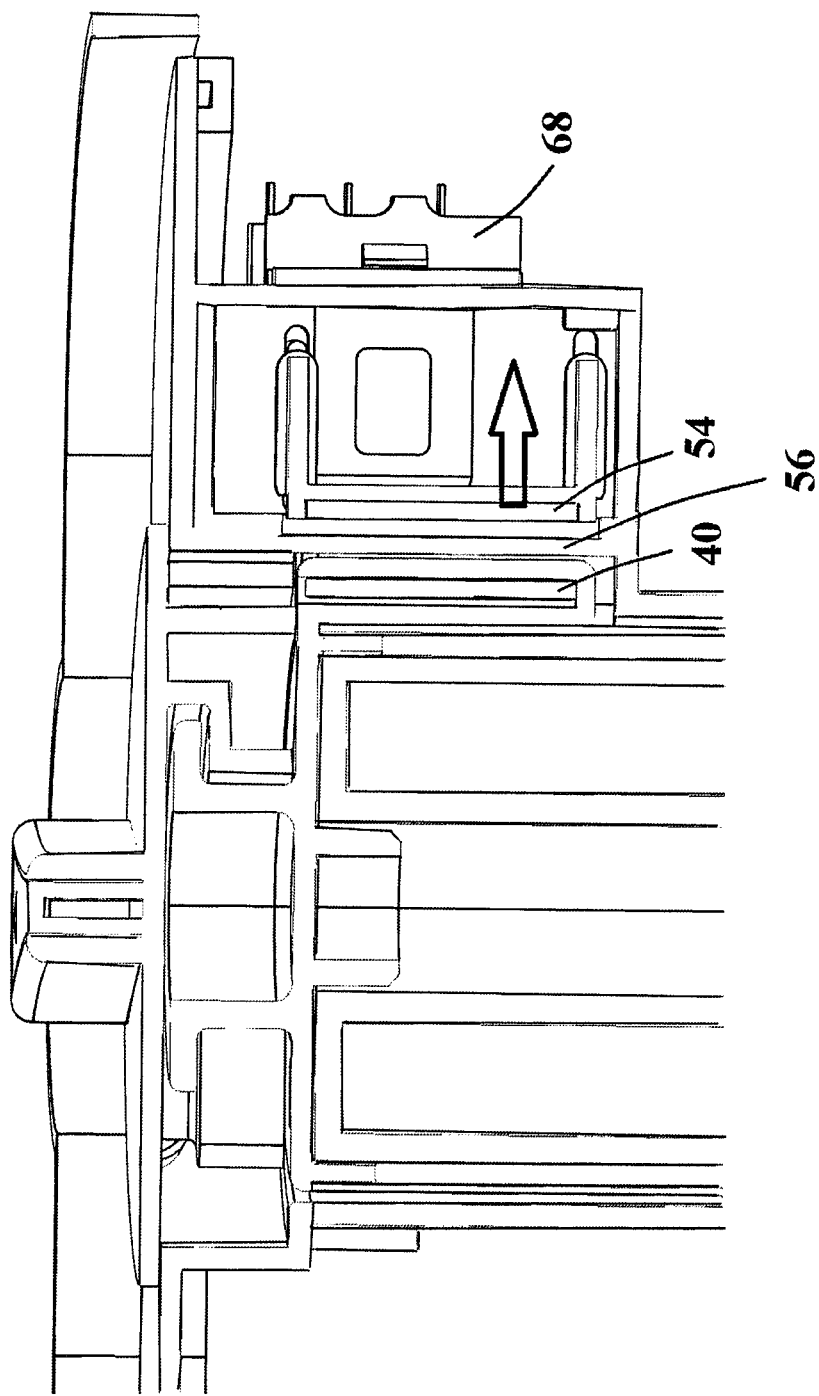

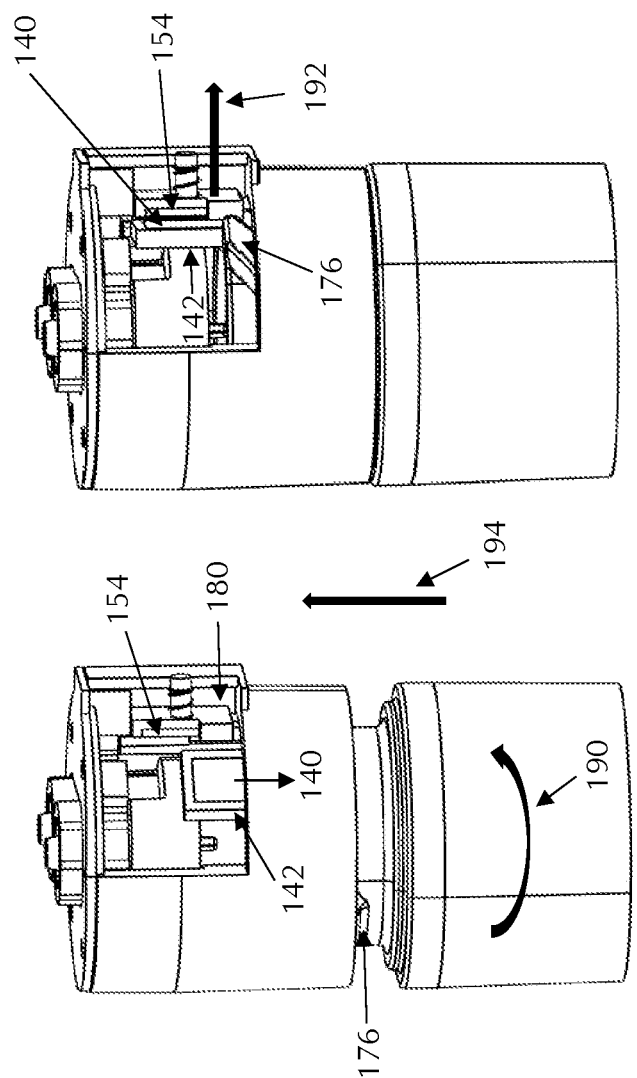

FILTER INTERCONNECT UTILIZING A MAGNETIC REPULSION FORCE

BACKGROUND OF THE INVENTION

1. Field of the Invention

The present invention relates to the interconnection scheme between a filter cartridge and its corresponding manifold. The invention utilizes a correlated magnetism design that encompasses correlated magnets, and more specifically, a magnetic repulsion force is introduced upon filter cartridge insertion into a mating manifold to aid in interconnection. In exemplary aspects, the interconnection scheme utilizes magnetic repulsion to aid in filter cartridge installation and/or removal. Embodiments of the present invention utilize magnetic repulsion to perform one or more of the following: mechanical actuation of a valve to permit fluid flow, removal of a blocking mechanism to allow for interconnection, and actuation of a mechanical latching mechanism.

2. Description of Related Art

Correlated magnet designs were introduced in U.S. Pat. No. 7,800,471 issued to Cedar Ridge Research LLC on Sep. 21, 2010, entitled "FIELD EMISSION SYSTEM AND METHOD" (the "'471 Patent"). This patent describes field emission structures having electric or magnetic field sources. The magnitudes, polarities, and positions of the magnetic or electric field sources are configured to have desirable correlation properties, which are in accordance with a predetermined code. The correlation properties correspond to a special force function where spatial forces correspond to relative alignment, separation distance, and a spatial force functions.

In U.S. Pat. No. 7,817,006, issued to Cedar Ridge Research LLC on Oct. 19, 2010, titled "APPARATUS AND METHODS RELATING TO PRECISION ATTACHMENTS BETWEEN FIRST AND SECOND COMPONENTS" (a related patent to the '471 Patent), an attachment scheme between first and second components is taught. Generally, a first component includes a first field emission structure and the second component includes a second field emission structure, wherein each field emission structure includes multiple magnetic field emission sources (magnetic array) having positions and polarities relating to a predefined spatial force function that corresponds to a predetermined alignment of the field emission structures. The components are adapted to be attached to each other when the first field emission structure is in proximity of the second field emission structure.

When correlated magnets are brought into alignment with complementary or mirror image counterparts, the various magnetic field emission sources that make up each correlated magnet will align causing a peak spatial attraction force, while a misalignment will cause the various magnetic field emission sources to substantially cancel each other out. The spatial forces (attraction, repulsion) have a magnitude that is a function of the relative alignment of two magnetic field emission structures, the magnetic field strengths, and their various polarities.

It is possible for the polarity of individual magnet sources to be varied in accordance with a code without requiring a holding mechanism to prevent magnetic forces from "flipping" a magnet. As an illustrative example of this magnetic action, an apparatus 1000 of the prior art is depicted in FIG. 1. Apparatus 1000 includes a first component 1002 and a second component 1012. The first component includes a first field emission structure 1004 comprising multiple field emission sources 1006. The second component includes a second field emission structure 1014 comprising multiple field emission sources 1016. The first and second components are adapted to attach to one another when the first field emission structure 1004 is in proximity of the second field emission structure 1014, that is, they are in a predetermined alignment with respect to one another.

The first field emission structure 1004 may be configured to interact with the second field emission structure 1014 such that the second component 1012 can be aligned to become attached (attracted) to the first component 1002 or misaligned to become removed (repulsed) from the first component. The first component 1002 can be released from the second component 1012 when their respective first and second field emission structures 1004 and 1014 are moved with respect to one another to become misaligned.

Generally, the precision within which two or more field emission structures tend to align increases as the number N of different field emission sources in each field emission structure increases, including for a given surface area A. In other words, alignment precision may be increased by increasing the number N of field emission sources forming two field emission structures. More specifically, alignment precision may be increased by increasing the number N of field emission sources included within a given surface area A.

In U.S. Pat. No. 7,893,803 issued to Cedar Ridge Research LLC on Feb. 22, 2011, titled "CORRELATED MAGNETIC COUPLING DEVICE AND METHOD FOR USING THE CORRELATED COUPLING DEVICE," a compressed gas system component coupling device is taught that uses the correlated magnet attachment scheme discussed above.

An illustrative example of this coupling device is shown in FIG. 2, which depicts a quick connect air hose coupling 1200 having a female element 1202 and a male element 1204.

The female element 1202 includes a first magnetic field emission structure 1218. The male element 1204 includes a second magnetic field emission structure 1222. Both magnetic field emission structures are generally planar and are in accordance with the same code but are a mirror image of one another. The operable coupling and sealing of the connector components 1202, 1204 is accomplished with sufficient force to facilitate a substantially airtight seal therebetween.

The removal or separation of the male element 1204 from the female element 1202 is accomplished by separating the attached first and second field emission structures 1218 and 1222. The male element is released when the male element is rotated with respect to the female element, which in turn misaligns the first and second magnetic field emission structures.

When conventional magnets are in close proximity, they create a force between them depending on the polarity of their adjacent faces, which is typically normal to the faces of the magnets. If conventional magnets are offset, there is also a shear force toward the alignment position, which is generally small compared to the holding force. However, multipole (coded polymagnets) magnets are different. As multipole magnets are offset, attraction and repulsion forces combine at polarity transitions to partially cancel normal forces while simultaneously establishing stronger shear forces.

Prior art filter interconnects present numerous technical hurdles, particularly with respect to installation, as well as removal and replacement of the filter cartridge when the filter media has served its useful life. Such technical hurdles include providing effective latching and unlatching mechanisms to retain manually-inserted filter cartridges in mating manifolds after installation, while including mechanisms such as switch-activated valve mechanisms so as to prevent the flow of water when the filter cartridge is removed for replacement. Other technical hurdles include incorporating effective authentication and/or anti-counterfeiting means to ensure that only authorized or OEM filter cartridges can be installed.

Therefore, a need exists for an improved filter interconnect which overcomes these technical hurdles, without substantially increasing the cost and complexity of manufacture.

The present invention adapts the correlated magnet technology described above to an interconnection structure for a filter cartridge and a corresponding manifold to resolve many of the technical hurdles of prior art filter interconnects.

As described herein, the correlated magnet technology has a variety of implementations in filter interconnect structures, including, for example, in actuation of switches or valves to permit or prevent fluid flow, as well as in filter authentication and anti-counterfeiting measures, such as permitting the actuation of blocking or engagement mechanisms to allow for proper attachment of only OEM or otherwise authorized replacement filter cartridges to a mating manifold.

SUMMARY OF THE INVENTION

Bearing in mind the problems and deficiencies of the prior art, it is therefore an object of the present invention to provide an improved filter interconnect structure for a filter cartridge and a corresponding filter manifold which utilizes correlated magnetism.

It is another object of the present invention to provide an improved filter interconnect which prevents leaking by dissociating the initial filter cartridge installation from the actuation of an upstream and/or downstream valve.

It is yet another object of the present invention to provide an improved filter interconnect and method of installing a filter cartridge in a corresponding filter manifold which utilizes correlated magnetism to move a blocking mechanism or position stop, or to actuate an attachment or latching mechanism to allow for proper filter cartridge installation.

Yet another object of the present invention is to provide an improved filter interconnect which utilizes correlated magnetism to provide an effective authentication and/or anti-counterfeiting means for ensuring proper filter cartridge installation.

Still other objects and advantages of the invention will in part be obvious and will in part be apparent from the specification.

The above and other objects, which will be apparent to those skilled in the art, are achieved in the present invention which is directed in one aspect to a filter interconnect comprising a filter manifold having ingress and egress fluid ports, a sump having an inner cavity for receiving a mating filter cartridge, an upwardly-extending alignment channel proximate the sump inner cavity, and a resilient blocking mechanism at least partially extending within the alignment channel when in a biased position and comprising a first correlated magnetic structure disposed therein. The correlated magnetic structure includes a magnet having a plurality of magnetic field emission sources having positions and polarities relating to a predefined spatial force function that corresponds to a predetermined alignment of said magnetic field emission sources. The blocking mechanism is movable in a first direction to a retracted position in response to a magnetic repulsion force generated when a complementary or paired second correlated magnetic structure is positioned within close proximity to the first magnetic structure.

The mating filter cartridge comprises a housing having a body, a top surface, an axial length, and an internal cavity, and an annular collar circumferentially located about the housing top surface and having an outer wall. The annular collar includes securing lugs or threads extending radially outwards from the annular collar outer wall. The complementary or paired second correlated magnetic structure is located on or within the annular collar and has a radially outwardly-facing surface that extends at least no further than an outward most radial extension of the securing lugs or threads. In an embodiment, the second correlated magnetic structure is provided within a tab extending in an axial direction from the annular collar. The tab may be positioned off-axial center of the filter cartridge body, and the securing lugs or threads may include upwardly-extending ramped segments.

Upon movement of the mating filter cartridge in a second direction, such as a rotational direction, to an alignment position within the filter manifold sump, the first and second correlated magnetic structures are within close proximity to one another such that the magnetic repulsion force is generated, which causes the blocking mechanism to move to the retracted position and allows the securing lugs or threads to continue moving in the second direction to complete attachment of the filter cartridge to the filter manifold.

In another aspect, the present invention is directed to a method of interconnecting a filter cartridge and a mating filter manifold. The method comprises inserting the filter cartridge into a sump of the mating filter manifold, the filter cartridge comprising a housing having a body with a top surface, and an annular collar circumferentially located about the housing top surface and having an outer wall, the annular collar including securing lugs or threads extending radially outwards from the annular collar outer wall and a first correlated magnetic structure located on or within the annular collar and having a radially outwardly-facing surface that extends at least no further than an outward most radial extension of the securing lugs or threads, wherein the first correlated magnetic structure includes a magnet having a plurality of magnetic field emission sources having positions and polarities relating to a predefined spatial force function that corresponds to a predetermined alignment of said magnetic field emission sources. The method further comprises aligning the securing lugs or threads with an alignment channel of the filter manifold, rotating the filter cartridge within the filter manifold sump in a first direction, and aligning the first magnetic structure plurality of magnetic field emission sources with a plurality of magnetic field emission sources of a complementary or paired second magnetic structure disposed within a resiliently biased blocking mechanism at least partially extending within the alignment channel of the filter manifold, such that a magnetic repulsion force is generated. The method further comprises displacing the blocking mechanism to a retracted position in a second direction in response to the magnetic repulsion force, wherein the second direction is approximately perpendicular to said first direction, and continuing to rotate the filter cartridge in the first direction such that the securing lugs or threads pass in front of the displaced blocking mechanism to complete attachment of the filter cartridge to the filter manifold.

In yet another aspect, the present invention is directed to a filter interconnect comprising a filter manifold for receiving a mating filter cartridge, the filter manifold having a top surface including ingress and egress stanchions for receiving ingress and egress fluid ports of the mating filter cartridge, a pivotable latch extending axially with respect to the top surface of the manifold and normally biased in an open position, and a first correlated magnetic structure disposed in or on the latch. The first magnetic structure includes a correlated magnet having a plurality of magnetic field emission sources having positions and polarities relating to a predefined spatial force function that corresponds to a predetermined alignment of said magnetic field emission sources. The latch further includes a protrusion or projection proximate the first correlated magnetic structure, and is pivotally responsive to a magnetic repulsion force generated when a complementary or paired second correlated magnetic structure is positioned within close proximity to the first magnetic structure.

The mating filter cartridge comprises a body and a filter head forming a fluid-tight seal with the body. The filter head includes the ingress and egress fluid ports and the complementary or second correlated magnetic structure located on or connected to an axially-extending portion of the filter head, the axially-extending portion further including a notch or cutout proximate the second correlated magnetic structure. The second correlated magnetic structure may include a magnet having a plurality of complementary magnetic field emission sources having positions and polarities relating to a predefined spatial force function that corresponds to a predetermined alignment of said magnetic field emission sources. In an embodiment, the correlated magnetic structure is provided within a tab extending in an axial direction from said filter head. The tab may extend parallel to a longitudinal axis of the filter cartridge body, and be radially offset from the ingress and egress fluid ports.

Upon insertion of the filter cartridge ingress and egress ports within the manifold ingress and egress stanchions, the first and second correlated magnetic structures are brought within close proximity to one another such that the magnetic repulsion force is generated, which causes the latch to pivot about a pivot axis to a closed position to engage the latch projection with the filter head notch or cutout to secure the filter cartridge.

In an embodiment, the filter manifold may further include a latch release button being manually actuable in a direction perpendicular to a longitudinal axis of the manifold to pivot the latch from the closed position to the open position to permit removal of the filter cartridge.

In at least one embodiment, the filter manifold may include axially-extending supports on opposing sides of the latch and integral with or connected to the manifold top surface, wherein the latch is coupled to the axially-extending supports via a pin or shaft extending transversely therebetween, the pin or shaft comprising the pivot axis.

In still yet another aspect, the present invention is directed to a method of interconnecting a filter manifold and a mating filter cartridge. The method comprises inserting ingress and egress fluid ports of the filter cartridge into ingress and egress stanchions of the filter manifold, wherein the filter cartridge further comprises a body and a filter head forming a fluid-tight seal with the body and including the ingress and egress fluid ports and a first correlated magnetic structure located on or connected to an axially-extending portion of the filter head. The axially-extending portion further includes a notch or cutout proximate the first correlated magnetic structure, wherein the first correlated magnetic structure includes a magnet having a plurality of magnetic field emission sources having positions and polarities relating to a predefined spatial force function that corresponds to a predetermined alignment of said magnetic field emission sources. The method further comprises aligning the first correlated magnetic structure plurality of magnetic field emission sources with a plurality of magnetic field emissions sources of a complementary or second correlated magnetic structure disposed in or on a pivotable latch extending from the top surface of the manifold, such that a magnetic repulsion force is generated, pivoting the latch from a biased open position to a closed position in response to the magnetic repulsion force, and engaging a protrusion or projection proximate the second correlated magnetic structure of the latch with a notch or cutout proximate the first magnetic structure of the filter head to complete attachment of the filter cartridge to the filter manifold.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 14 depicts a side, plan view of the filtration system of FIG. 13, showing the position of the paired correlated magnets when the filter cartridge is in an installed position;

FIGS. 21A-21E depict side plan views of the filter interconnect of FIG. 15, showing the method of installation of the filter cartridge;

DESCRIPTION OF THE EMBODIMENT(S)

Figure 1:
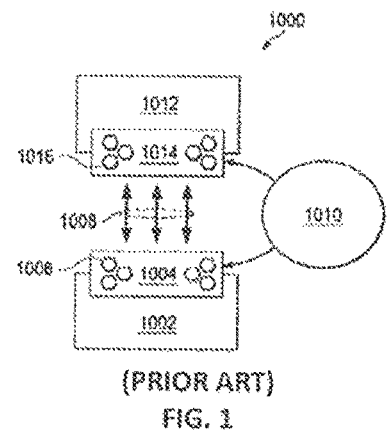
FIG. 1 depicts an apparatus of the prior art having two components magnetically attached to one another.

In describing the embodiments of the present invention, reference will be made herein to FIGS. 1-39 of the drawings in which like numerals refer to like features of the invention.

Certain terminology is used herein for convenience only and is not to be taken as a limitation of the invention. For example, words such as "upper," "lower," "left," "right," "front," "rear," "horizontal," "vertical," "upward," "downward," "clockwise," "counterclockwise," "longitudinal," "lateral," or "radial", or the like, merely describe the configuration shown in the drawings. Indeed, the referenced components may be oriented in any direction and the terminology, therefore, should be understood as encompassing such variations unless specified otherwise. For purposes of clarity, the same reference numbers may be used in the drawings to identify similar elements.

Additionally, in the subject description, the words "exemplary," "illustrative," or the like, are used to mean serving as an example, instance or illustration. Any aspect or design described herein as "exemplary" or "illustrative" is not necessarily intended to be construed as preferred or advantageous over other aspects or design. Rather, the use of the words "exemplary" or "illustrative" is merely intended to present concepts in a concrete fashion.

Correlated magnets, also interchangeably referred to herein as coded polymagnets, contain areas of alternating poles. These patterns of alternating poles can concentrate and/or shape magnetic fields to give matching pairs of magnets unique properties. The present invention utilizes correlated magnet designs with "high auto-correlation and low cross-correlation" which is a characteristic of correlated magnets which only achieve peak efficacy (magnet attraction or repulsion) when paired with a specific complementary magnet. An example of such use of correlated magnets is disclosed in U.S. Pat. No. 8,314,671 issued to Correlated Magnets Research LLC on Nov. 20, 2012, entitled "KEY SYSTEM FOR ENABLING OPERATION OF A DEVICE." Correlated magnets are also characterized by dense and tunable magnetic fields, allowing for specifically engineered force curves with higher force at shorter working distances.

Figure 2A:
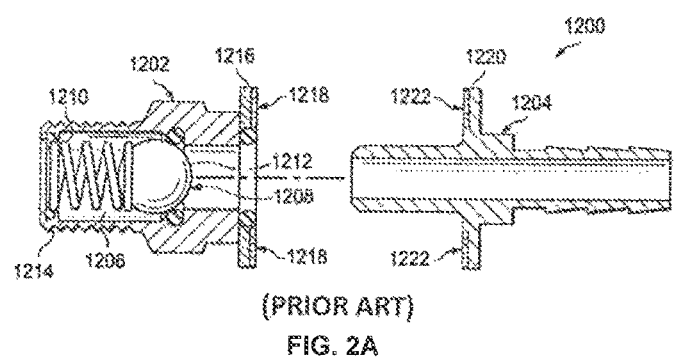
FIG. 2A depicts a quick connect air hose coupling of the prior art showing placement of correlated magnets for attachment.
Figure 2B:
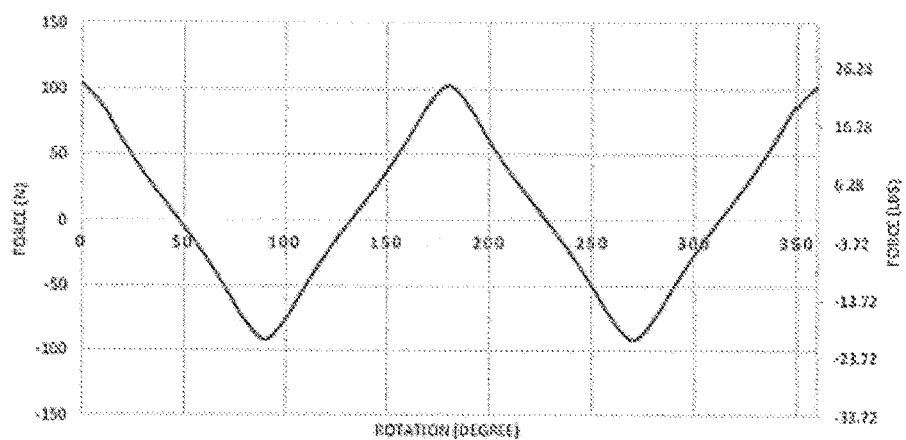
FIG. 2B depicts a graph of varying magnetic forces of correlated magnets depending on the relative rotational orientation of the pair of magnets (e.g., repulsion-attraction-repulsion- attraction at 90-degree intervals) shown for a 0.5 mm magnet-to-magnet gap.

In addition, correlated magnets can be designed to have varying magnetic forces depending on the relative rotational orientation of the pair of magnets (e.g., repulsion-attraction-repulsion-attraction at 90-degree intervals) as illustrated on the graph of FIG. 2B.

The present invention utilizes a magnetic repulsion model applied to a filter interconnect, which allows for a higher degree of control and flexibility over the timing and actuation of critical system functions through an engineered system of correlated magnets, springs and simple machines. Integral to the design is a matching set of "keyed" correlated magnets disposed in/on the filter cartridge housing and filter manifold, respectively, which provide the initial drive to engage downstream functions through non-electric and non-contacting actuation of an electronic system. The embodiments of the present invention described herein illustrate the actuation of a downstream valve (e.g., spool valve or other valve design) to allow for the flow of water; however, it should be understood by those skilled in the art that actuation of a valve is only one example of a downstream component intended to be within the scope of the present invention and that other components are not precluded, such as a dosing system or other electronic system.

This is accomplished by having a pair of magnets, preferably correlated magnets, oriented parallel to one another on each component of the connecting pair when in an alignment position, wherein a first coded polymagnet is disposed on a filter cartridge and a complementary, paired coded polymagnet is located on the manifold designed to secure the filter cartridge into position. It should be understood by those skilled in the art that a "correlated magnet" or "coded polymagnet" as referred to herein may comprise a single magnet with a plurality of polarity regions or, alternatively, may comprise multiple magnets arranged to create a polarity pattern with the desired characteristics. In at least one embodiment, a thin layer of material is introduced, physically separating the two polymagnets so they cannot have physically contacting surfaces, but they can still magnetically repel one another.

When a correct set of "keyed" polymagnets are aligned and brought into an effective working distance, the result is a repulsion force between the two magnets. The polymagnet disposed on the filter cartridge is fixed; however, the corresponding polymagnet disposed in/on the mating filter manifold is permitted to translate, acting against the mechanical force of a spring. The function of the magnet located on the manifold is to assist in actuating a valve (e.g., spool valve, cam and poppet valve, and other valve types) through activation of an electronic switch, normally biased in a first position by a spring. As will be described in more detail below, the force curves of the spring and correlated magnet couple are engineered such that only a set of corresponding "keyed" polymagnets will provide sufficient magnetic force to overcome the spring force to activate the switch. When the spring is fully depressed, one or more critical system functions are actuated, i.e., upstream and/or downstream valves, dosing systems, or other electronic systems, for example.

During installation, the filter cartridge may be guided by an alignment rail or thread and boss/lug system so that the correlated magnet disposed on the filter cartridge and the corresponding correlated magnet on the manifold are aligned (in-phase forming a repulsion force) but not in contact, when in the INSTALLED-LOCKED position. In at least one embodiment, the correlated magnet in the manifold physically actuates a limit switch when repelled by the filter magnet. When the filter is first fully inserted into the manifold in an INSTALLED-UNLOCKED position, the O-rings are sealed but the filter and manifold magnets are not aligned, and consequently, the upstream and/or downstream valve(s) are not open and water is not permitted to flow through the filter element. The filter assembly is then rotated 90-degrees into the INSTALLED-LOCKED position, which brings the "keyed" correlated magnets into alignment, thereby achieving peak efficacy (magnetic repulsion), overcoming a spring force and causing the manifold magnet to translate linearly to actuate a limit switch. In an embodiment, the positive engagement of the switch opens upstream and/or downstream valves and allows for the flow of water.

Figures 3, 4:
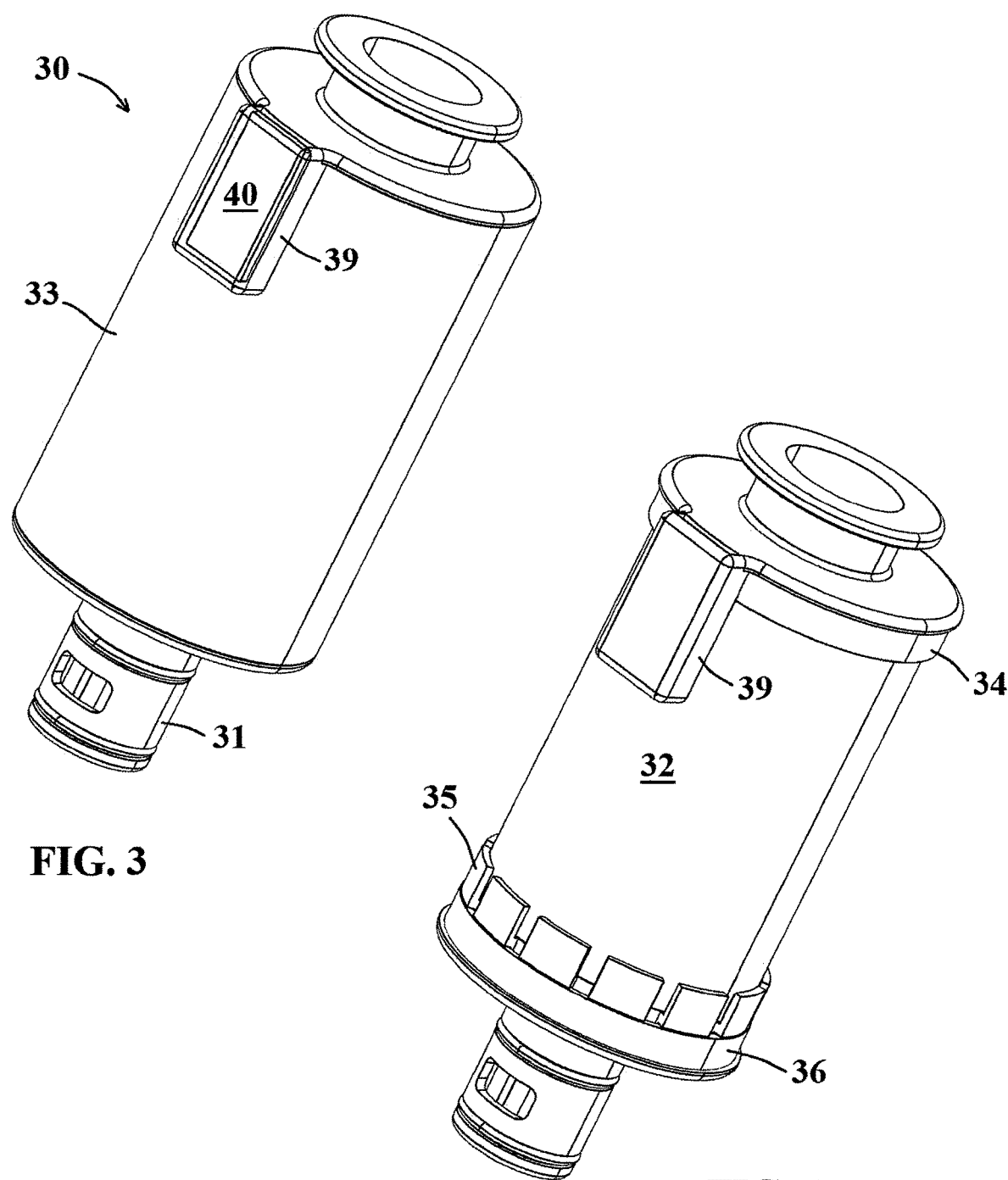
FIG. 3 depicts a perspective view of a filter cartridge according to an embodiment of the present invention. The filter cartridge includes a first correlated magnet radially attached to one of the filter cartridge end caps.
FIG. 4 depicts a perspective view of a filter cartridge according to an embodiment of the present invention, with the dry change sleeve removed.
Figure 5:
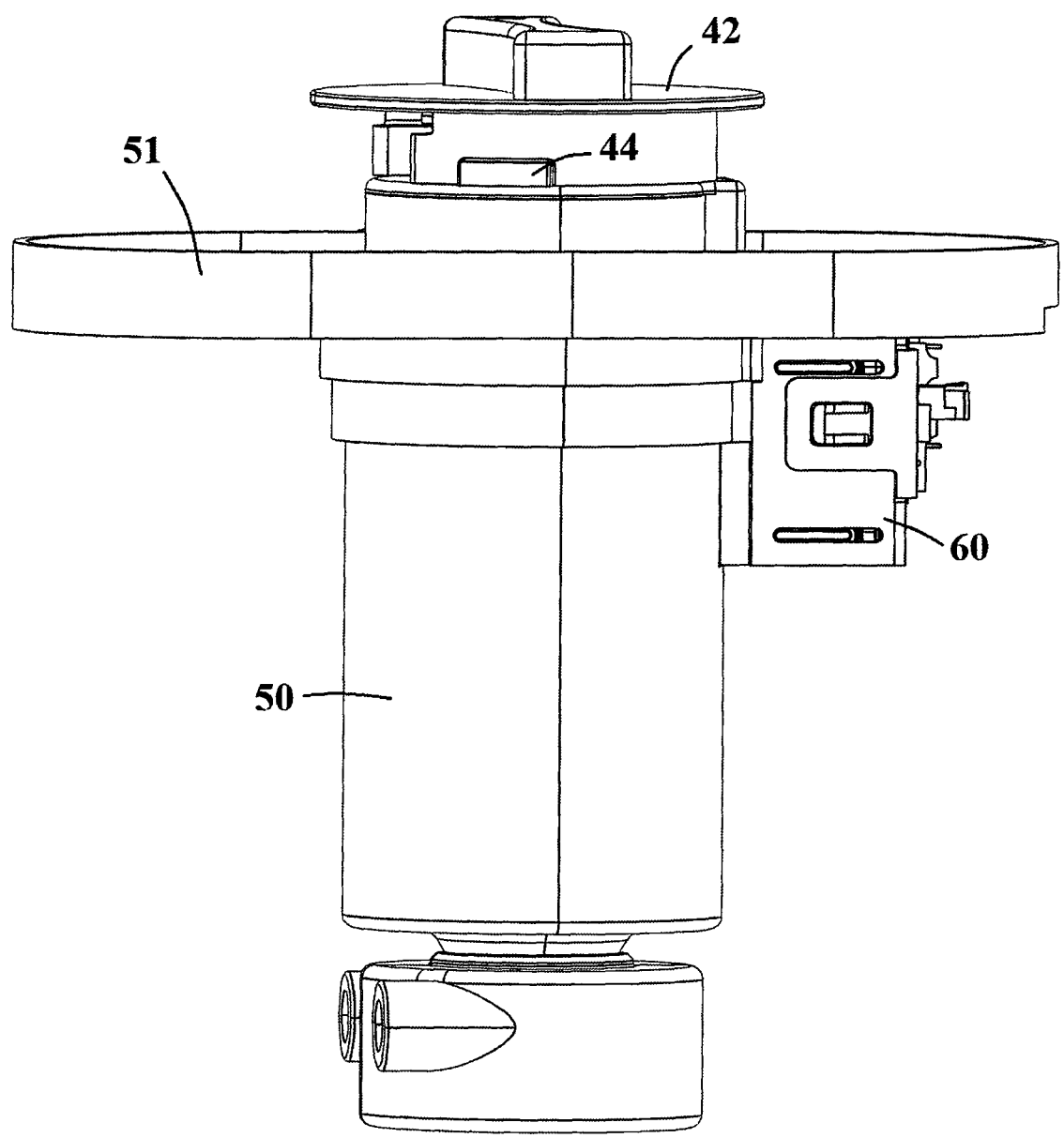
FIG. 5 depicts a side plan view of a filtration system including a green filter cartridge and corresponding filter manifold according to an embodiment of the present invention, with the filter cartridge in an uninstalled position. The filter manifold includes a second, paired correlated magnet operably coupled to an electronic switch for engaging downstream system functions.

Referring now to FIGS. 3-14, collectively, one embodiment of the filter cartridge and manifold of the present invention is shown. Replaceable filter cartridge 30 comprises a filter media 32 encased between end caps 34, 36 and includes a correlated magnet 40 located at the cartridge top end proximate the outside surface of the cartridge body. End cap 36 includes a manifold cup 35 integral therewith for securing filter media 32 and facilitating connection to manifold 50. As shown in FIGS. 3 and 4, end cap 34 may include a downward, axially-extending magnetic housing 39 which secures on its outside surface or embedded therein magnet 40. Filter cartridge 30 further includes an axial stem 31 comprising ingress and egress fluid ports. Filter cartridge 30 is initially insertable within a sump 56 in manifold 50 into a partially-INSTALLED position, wherein the O-rings are sealed but the downstream valve(s) are not open and water is not permitted to flow (FIG. 5). Surrounding filter media 32 and filter cup 35 is a dry change sleeve 33 forming the filter cartridge body, which is disposed between filter media 32 and sump 56 when the filter cartridge is inserted into the sump.

Figure 6:
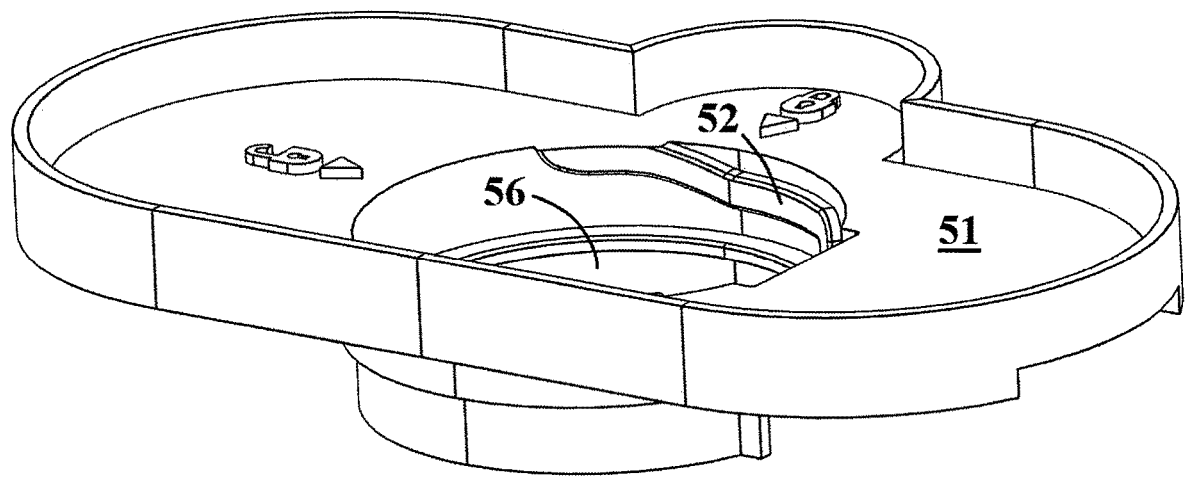
FIG. 6 depicts a perspective view of a locking plate for a filter manifold in accordance with an embodiment of the present invention.
Figure 7:
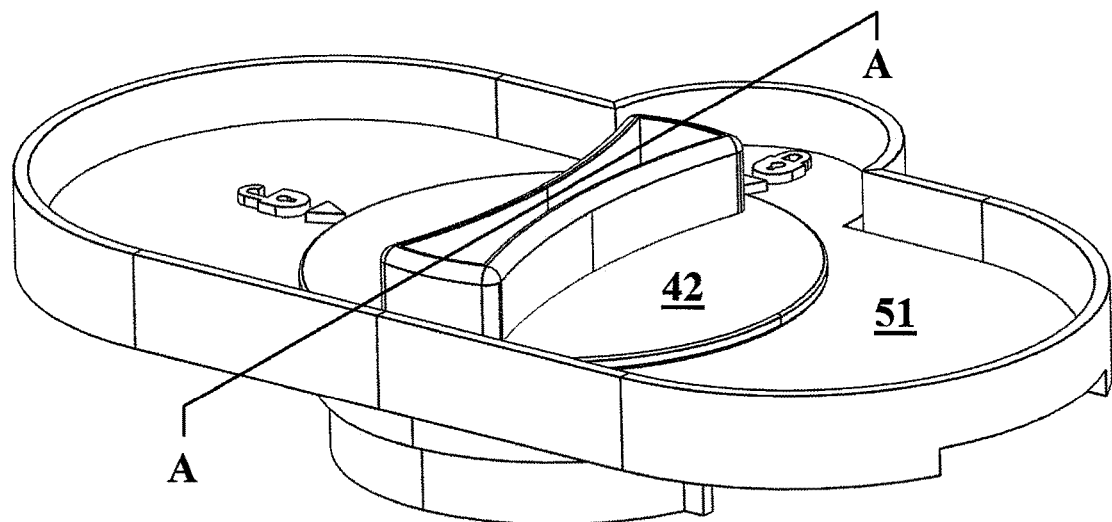
FIG. 7 depicts a perspective view of the locking plate of FIG. 6 with a locking cover for a filter cartridge according to an embodiment of the present invention in an installed position.
Figure 8:
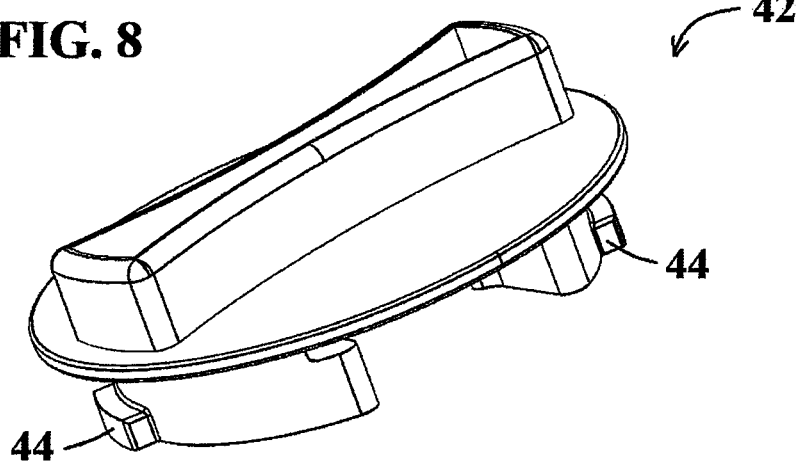
FIG. 8 depicts a perspective view of the filter cartridge locking cover of FIG. 7.
Figure 9:
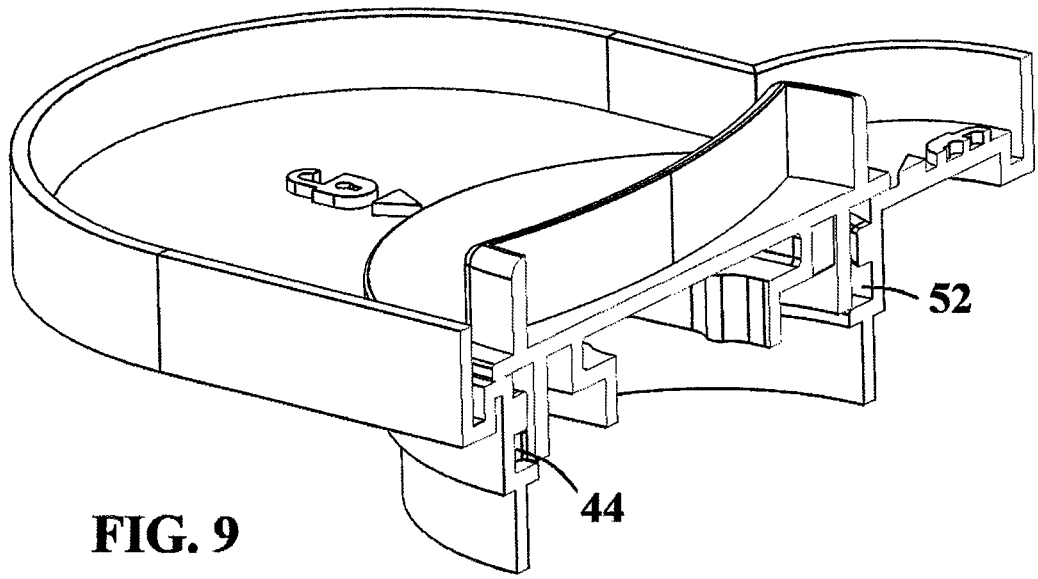
FIG. 9 depicts a perspective, cross-sectional view of FIG. 7 taken along line A-A, showing a boss or lug radially disposed on the locking cover being received and guided in an alignment rail or thread of the manifold locking plate as the filter cartridge moves into the installed position.
Figure 13:
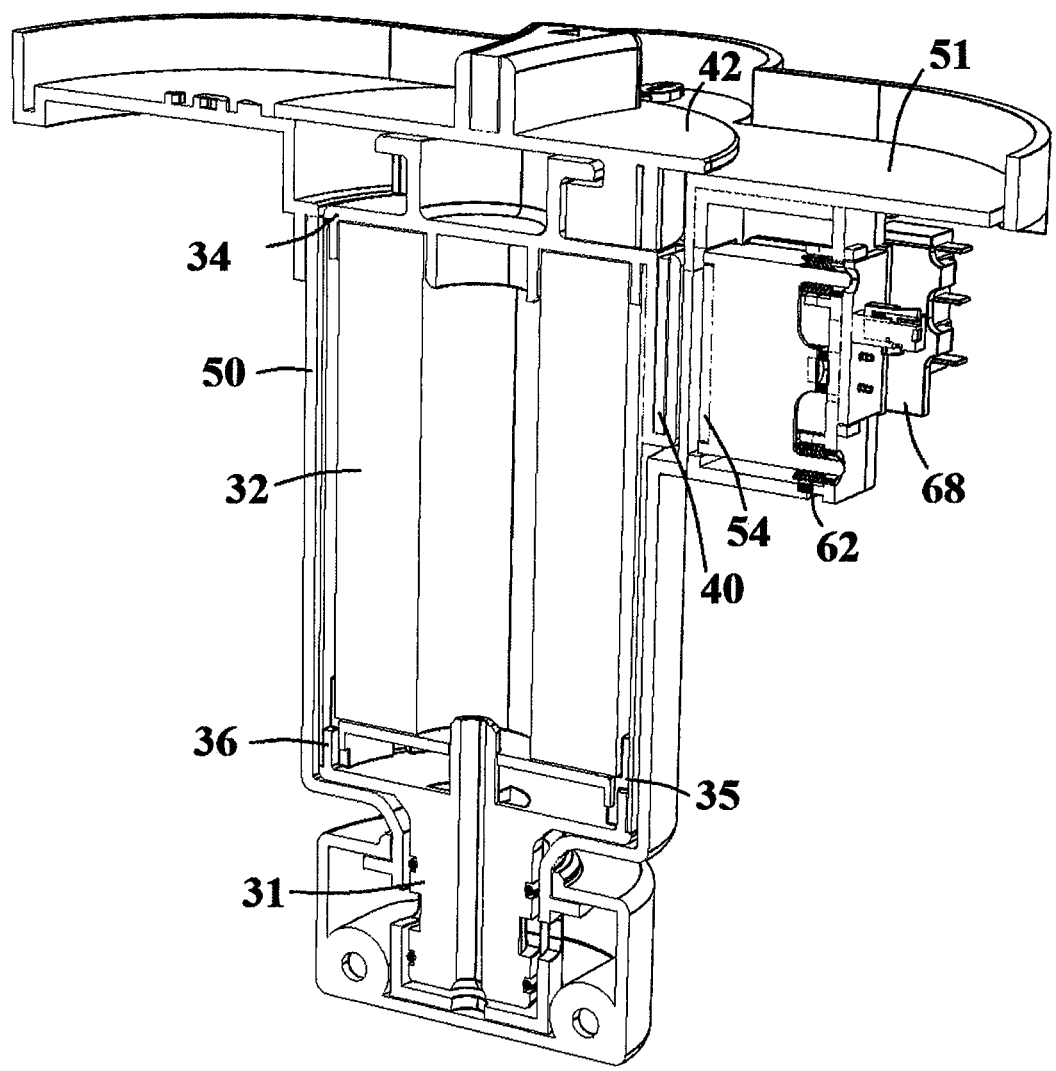
FIG. 13 depicts a perspective, cross-sectional view of the filtration system of FIG. 12.

As shown in FIG. 5, and best seen in FIGS. 6-7, in an embodiment, manifold 50 may include a radially-extending locking plate 51 including an aperture for permitting insertion of filter cartridge 30 into sump 56 and further including an alignment rail or thread 52 representing an "entry track" for filter cartridge 30 by receiving filter boss or lug 44 of locking cover 42 when filter cartridge 30 is inserted within sump 56 and connected to manifold 50. Thread 52 may be a "Z-thread" and is threaded to allow for 90-degree rotation of the filter cartridge 30 from a first, unlocked position to a second, locked position, as shown in FIG. 6. It should be understood by those skilled in the art that alignment thread 52 is not limited to a "Z-thread" or other continuous, segmented path, and that otherwise-shaped continuous pathways or threads are within the scope of the invention so long as the thread functions to bring the correlated magnets 40, 54 within an effective working distance as the filter cartridge is inserted within the sump. As shown in FIGS. 7 and 8, a locking cover 42 may be connected to filter cartridge end cap 34 to aid in filter assembly installation. As the locking cover 42 is rotated, boss or lug 44 travels along alignment rail 52 to its end, pushing the filter cartridge axially downward (i.e., into the sump). As can be seen in FIG. 13, this end rotational position of boss or lug 44 within alignment rail 52 places the filter cartridge 30 and filter magnet 40 in an alignment position for filtering operation. In the embodiment shown, locking cover 42 is rotatable about the longitudinal axis of the sump, while the filter cartridge translates axially and does not rotate; however, it should be understood by those skilled in the art that in other embodiments, end cap 34 and locking cover 42 may be one molded piece rather than two connected structures, such that the filter cartridge rotates into the alignment position. In still other embodiments, the filter assembly does not include a locking cover and the filter cartridge end cap includes a boss or lug radially disposed on an outer surface thereof for being received in an alignment channel or track of the manifold.

Figure 10:
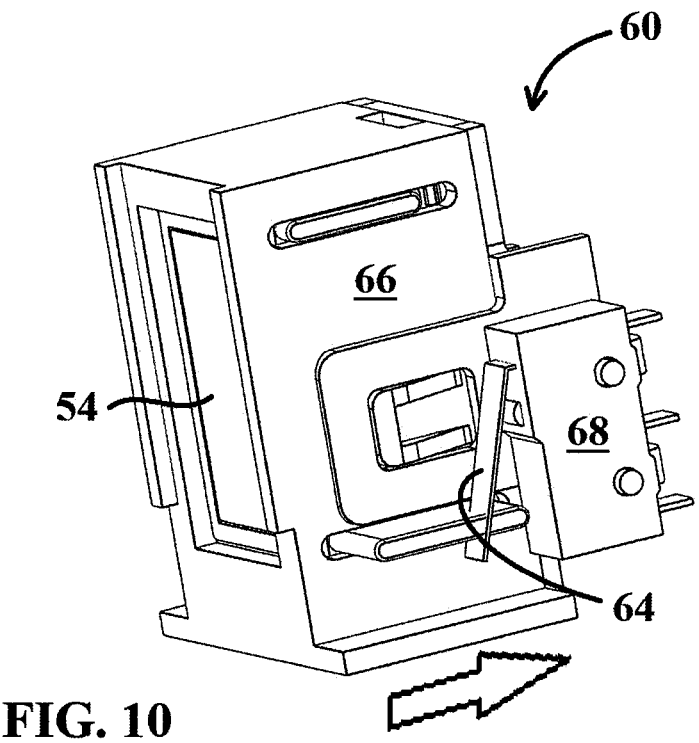
FIG. 10 depicts a perspective view of a switch assembly in accordance with an embodiment of the present invention.
Figure 11:
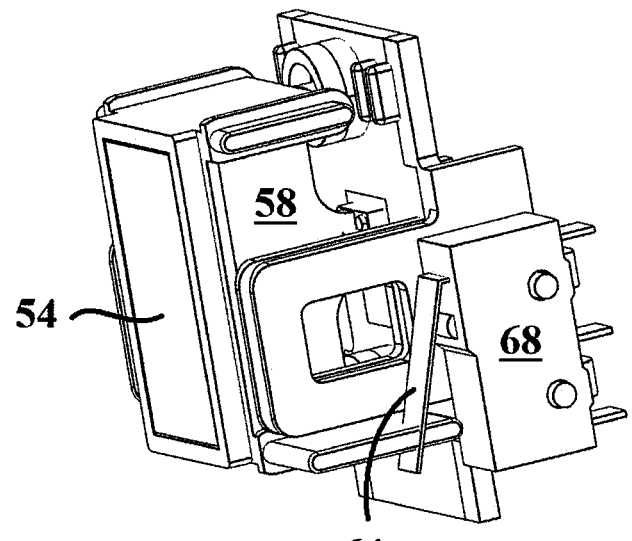
FIG. 11 depicts a perspective view of the switch assembly of FIG. 10, with mounting bracket removed to show the interior components of the assembly.

As further shown in FIG. 5, and best seen in FIGS. 10-11, manifold 50 includes a correspondingly "keyed" or paired correlated magnet 54 positioned for alignment with filter magnet 40 when boss or lug 44 is at the end of alignment rail 52. Magnet 54 is part of a switch assembly 60 for actuating a downstream valve. As shown in FIG. 10, switch assembly 60 is disposed within mounting bracket 66 and comprises magnet 54, spring 62 and actuator 64 mechanically linked to a set of contacts for limit switch 68. Magnet 54 is non-rotatable but slidable linearly within magnet housing or holder 58 in a direction normal to the longitudinal axis of the sump. Holder 58 with magnet 54 is operably coupled with limit switch 68, which is normally biased in the closed position by spring 62.

Figure 12:
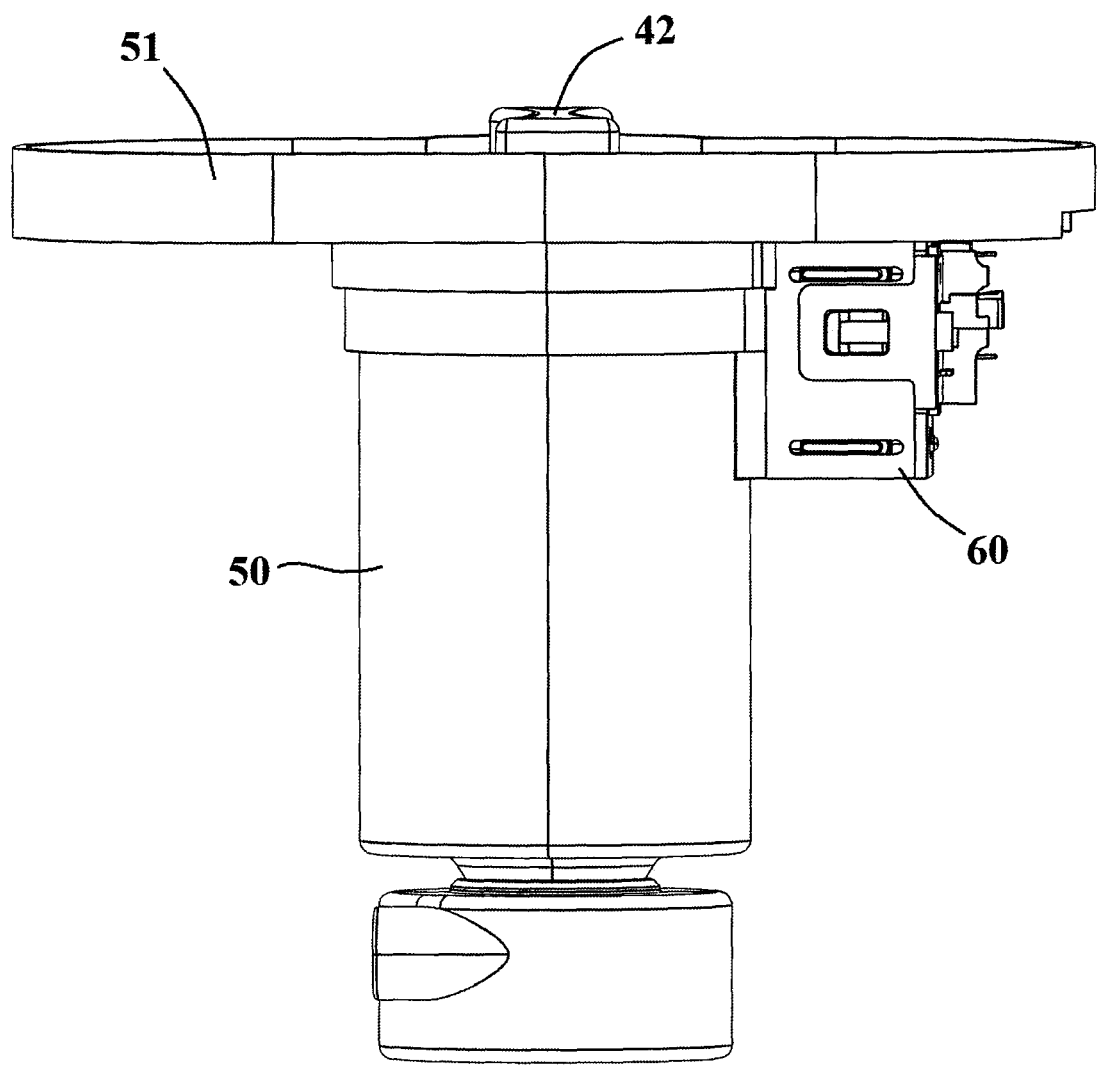
FIG. 12 depicts a side plan view of the filtration system of FIG. 4, with the filter cartridge in an installed position and the switch activated.

When filter magnet 40 and manifold magnet 54 are in alignment and brought into an effective working distance, as shown in FIGS. 12-14, the result is a repulsion force between the two magnets. The force curves of the spring 62 and magnet couple 54 are engineered such that at peak efficacy, there is sufficient magnetic repulsion force to overcome the spring force of the switch, compressing the spring in the direction of the arrow, as shown in FIG. 14, and causing holder 58 to come into contact with actuator 64 to make the electrical connection to activate limit switch 68. When the spring is fully depressed, limit switch 68 is activated, which in turn actuates a valve (not shown), allowing for the flow of water. In one embodiment, as best seen in FIG. 14, when the filter cartridge 30 is in the INSTALLED-LOCKED position, filter magnet 40 and manifold magnet 54 are in an effective working distance of approximately 4 mm. Disposed between the magnets when the filter cartridge is connected to the manifold is a portion of sump 56, which prevents contact between magnets 40, 54 while still allowing for magnetic cooperation. Sump 56 is a molded piece of the filter manifold and acts as the pressure vessel for the filter cartridge, which is typically a plastic filter housing surrounding the filter media. The lack of a pressure bearing filter housing on the replaceable filter cartridge reduces the amount of plastic needed during manufacture of the filter cartridge and promotes "green" filtering. In an embodiment, filter cartridge may include a sheath or other thin material layer comprising the filter cartridge "body," shown in FIG. 3 as polyethylene dry change sleeve 33, surrounding the filter media (which cannot absorb pressure) and is intended to allow for removal and replacement of the filter cartridge from the manifold by a user without contacting the wet filter media.

As further shown in FIG. 14, in an embodiment, spring 62 requires an additional 4 mm of travel to activate the limit switch 68, and therefore the paired correlated magnets 40, 54 are adapted to produce sufficient magnetic repulsion force for a distance of approximately 8 mm. Providing a magnetic repulsion force sufficient to double the required distance will safely accommodate design and manufacturing tolerances, and ensure switch activation. In that correlated magnets are characterized by dense and tunable magnetic fields, it is possible to specifically engineer force curves with higher force at shorter working distances. A conventional magnet would be unable to produce sufficient magnetic force over such a short effective distance without significantly increasing the physical size of the magnet, which would present design feasibility issues. It should be understood by those skilled in the art that for physically small magnets like those used in the present invention, correlated magnets are preferable because of the strength advantage attainable at very short working distances. It should be further understood by those skilled in the art that 4 mm is shown as an effective working distance between the magnets for exemplary purposes only, and that in other embodiments the effective working distance may be shorter than 4 mm, in accordance with design requirements. An effective working distance of greater than 4 mm is also achievable.

In addition to providing the initial drive to engage downstream system functionality, the magnetic communication between the filter and manifold magnets 40, 54 has the added benefit of providing filter authentication and anti-counterfeiting measures. Unless the polarity arrays or patterns of the correlated magnets 40, 54 are correspondingly "keyed" or paired, the magnetic communication will not actuate the switch assembly 60 and therefore the valve will not open to allow for water flow. As such, only a genuine OEM filter cartridge will function and a non-OEM or counterfeit filter cartridge will be non-operational. This also limits the counterfeiting market, which is especially important with respect to the safety of consumers seeking clean drinking water who believe that they may be able to save money by purchasing a non-authentic replacement filter cartridge which mechanically may connect to a mating manifold, but may nonetheless not have an enclosed filter media which is as effective for removal of contaminants or impurities in water as that of the filter media of a genuine replacement part.

In other embodiments, the magnetic communication between the filter and manifold magnets can be used for enhanced mechanical filter authentication purposes, such as to move a blocking mechanism which normally prevents insertion of a filter cartridge in a manifold, or to actuate an attachment or latch mechanism for the filter cartridge.

One such use is shown in FIGS. 15-21, inclusive, showing a translatable, resilient blocking mechanism or position stop which prevents insertion and/or attachment of a filter cartridge into a corresponding manifold. During installation, the filter cartridge may be guided by securing lugs or treads on the cartridge into a corresponding alignment track on the filter manifold. A blocking mechanism or position stop and manifold magnet integral with or mounted thereon are normally biased in a closed position by a spring to block the alignment track and prevent insertion of a filter cartridge, but are linearly or radially translatable about the filter manifold to allow for attachment of the cartridge. A corresponding polymagnet is disposed on the filter cartridge, such that when the filter cartridge is inserted into the alignment track on the filter manifold, the "keyed" polymagnets become aligned when in proximity (in-phase generating a repulsion or shear force), resulting in a force strong enough to overcome the spring force and causing the blocking mechanism or position stop to be moved to the open position and allowing the securing threads on the filter cartridge to pass by, thus permitting attachment of the filter cartridge to the manifold.

Figure 17:
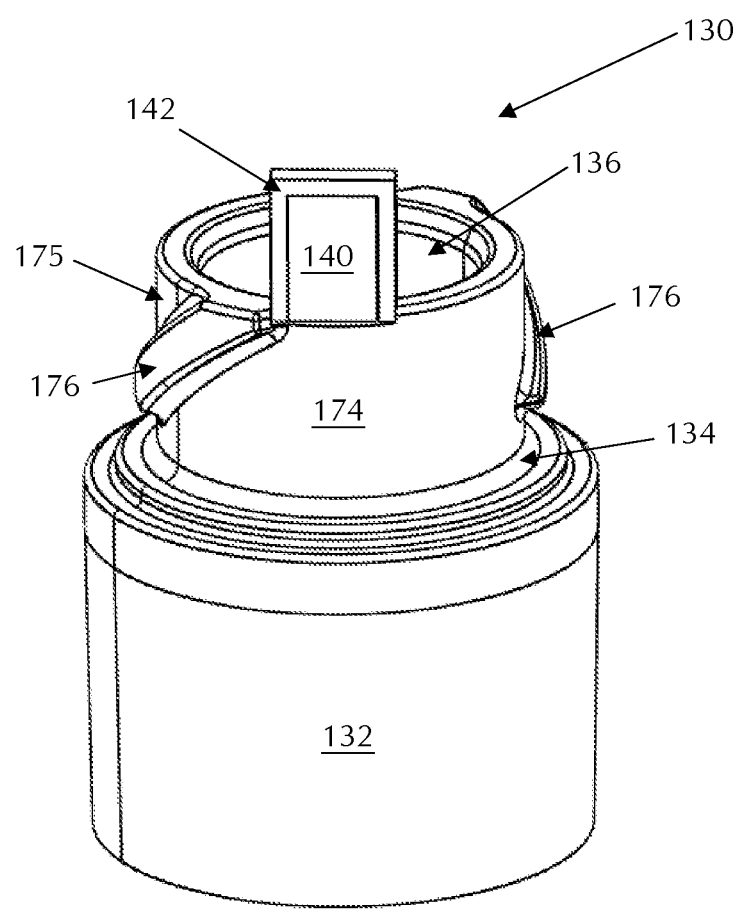
FIG. 17 depicts a front, plan view of the filter cartridge of FIGS. 15 and 16.

As shown in FIG. 17, filter cartridge 130 includes a body 132 having an axial length and a top surface 134 about which annular collar 174 is circumferentially located. Internal cavity 136 includes a filter media (not shown, for clarity) for filtering fluid received from the manifold 150. Securing lugs or threads 176 extend from annular collar 174, and as shown in the Figures, may comprise radially-positioned, upwardly-extending ramped segments for rotational interconnection with manifold 150 upon initial axial insertion of the filter cartridge. Annular collar 174 further includes an axially upwardly-extending portion comprising a tab or magnetic structure 142 integral with and off axial center of the filter housing body, within which coded polymagnet 140 is disposed. Polymagnet 140 may be a correlated magnet as described herein, having a plurality of magnetic field emission sources having positions and polarities relating to a predefined spatial force function that corresponds to a predetermined alignment of the magnetic field emission sources. In the embodiment shown, magnetic structure 142 with magnet 140 embedded therein extends parallel to the longitudinal axis of the filter cartridge body 132 and has a radially outwardly-facing surface 143 that extends at least no further than an outward most radial extension of securing lugs or threads 176, and in the embodiment shown, extends no further than the outside wall 175 of annular collar 174, so as to not interfere with rotation of the filter cartridge upon interconnection with the mating manifold.

Figure 18:
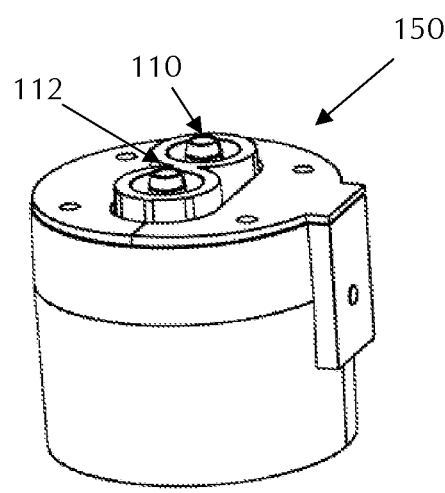
FIGS. 18-20 depict side, partially cutaway, and bottom perspective views, respectively, of the filter manifold of FIGS. 15-16, with the blocking mechanism or position stop in a "home" position.
Figure 20:
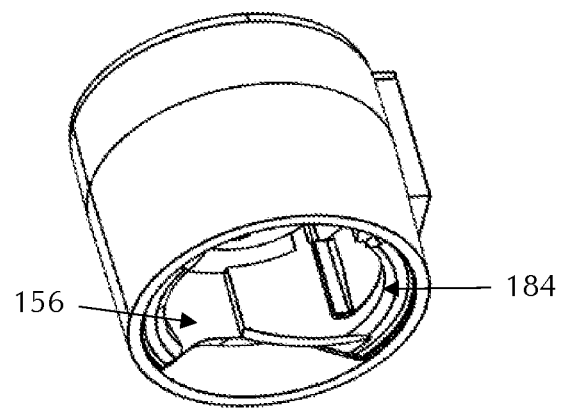
Figure 19:
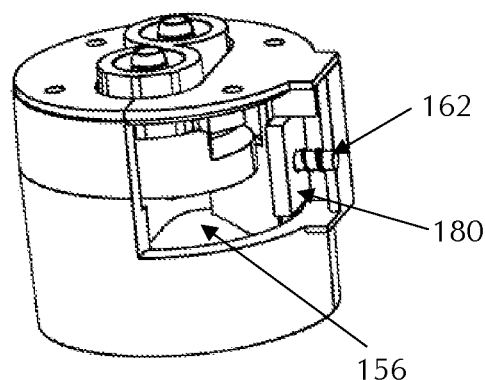

FIGS. 18-20 show various views of the mating manifold 150. As best seen in FIG. 20, manifold 150 may include an internal cavity or sump 156 having a channel 184 proximate the inner cavity on an inner surface thereof representing an alignment track for filter cartridge 130. Channel or track 184 receives securing lugs or threads 176 extending from annular collar 174 of filter cartridge 130. Manifold 150 further includes a biased position stop or blocking mechanism 180 in the form of a linearly-translatable magnet shuttle within which a correspondingly "keyed" coded polymagnet 154 is disposed. Magnet 154 includes a plurality of complementary magnetic field emission sources having positions and polarities relating to a predefined spatial force function, such that a magnetic repulsion force is generated when magnet 140 is brought within close proximity of magnet 154 during filter interconnection. Position stop 180 is non-rotatable but translatable linearly in a radial direction, i.e., perpendicular to the longitudinal axis of the manifold 150. Resilient blocking mechanism 180 is normally biased by spring 162 to at least partially extend within the sump channel 184, such that filter cartridge alignment lug or thread 176 contacts a side surface of position 180 as the filter cartridge 130 is axially inserted into the manifold and rotated toward an INSTALLED position, preventing proper installation. Manifold 150 has fluid ingress and egress ports 110, 112 which allow incoming fluid to be received by the manifold, flow into filter cartridge 130, and receive filtered fluid from the filter cartridge. Lugs or threads 176 secure filter cartridge 130 to manifold 150 upon rotation against pressurized fluid flow. A locking mechanism may also be employed to secure further the filter cartridge from reverse rotation.

Figure 16:
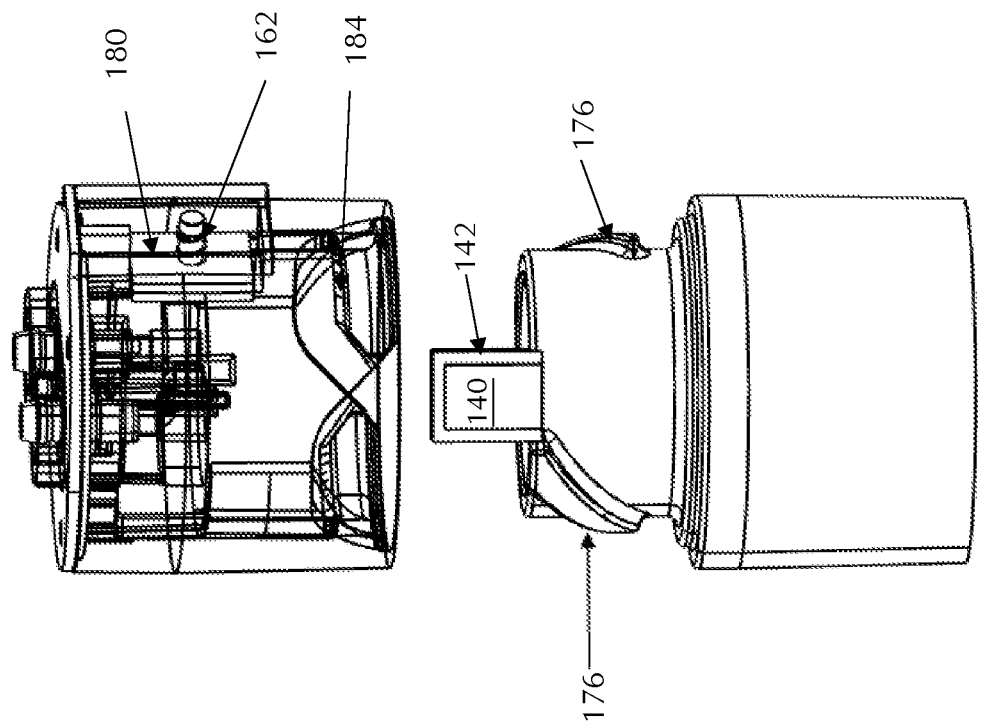
FIG. 16 depicts the filter interconnect of FIG. 15, with the filter manifold partially transparent to show the initial position of the manifold magnet.
Figure 15:
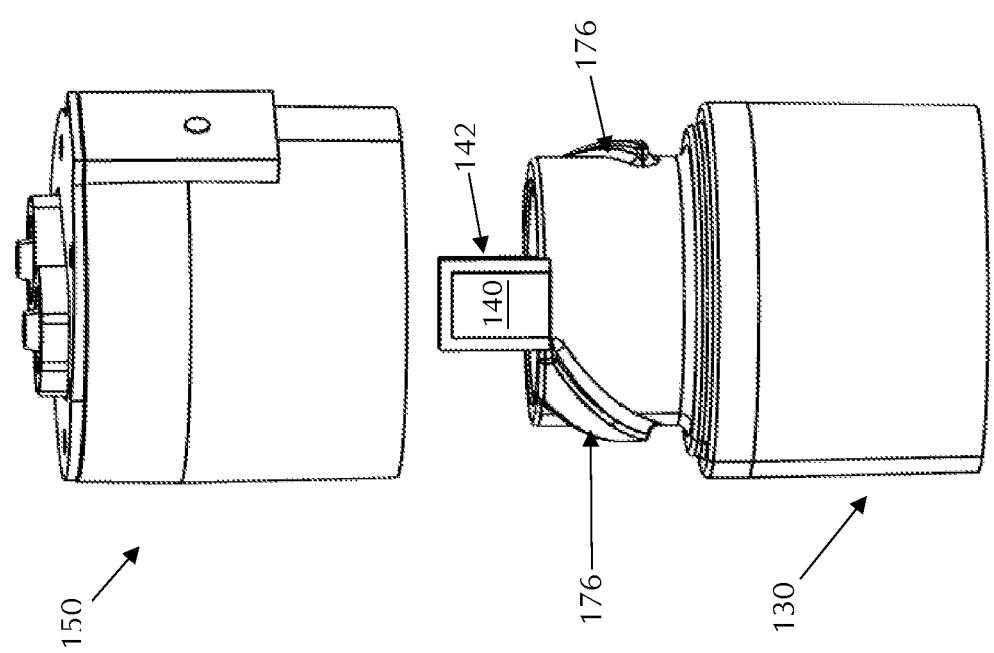
FIG. 15 depicts another embodiment of a filter interconnect according to the present invention, in an UNINSTALLED position, where the coded polymagnets are used to move a blocking mechanism to allow for filter cartridge installation into a mating manifold.

As shown in FIGS. 15-17, lugs or threads 176 are shown extending radially outwards from an outside wall of annular collar 174. It is also possible to have receiving apertures and/or receiving threaded grooves on the outside wall of the annular collar 174 to receive lugs or threads on the manifold. Tab or magnetic structure 142 is shown extending axially upwards from annular collar 174 and radially outwards at least less than the outward most radial extension of lugs 176, and preferably no further radially outwards than the outside wall of annular collar 174, such that tab 142 does not interfere with the rotation of the filter cartridge within the receiving manifold. It is also possible for tab 142 to be form-fit within the annular collar or on the inside wall of the annular collar, and it need not extend axially upwards from the annular collar. The necessary condition for attachment is that there is magnetic communication between the polymagnet located on the filter cartridge and the complementary polymagnet located on the manifold.

Figure 21A:
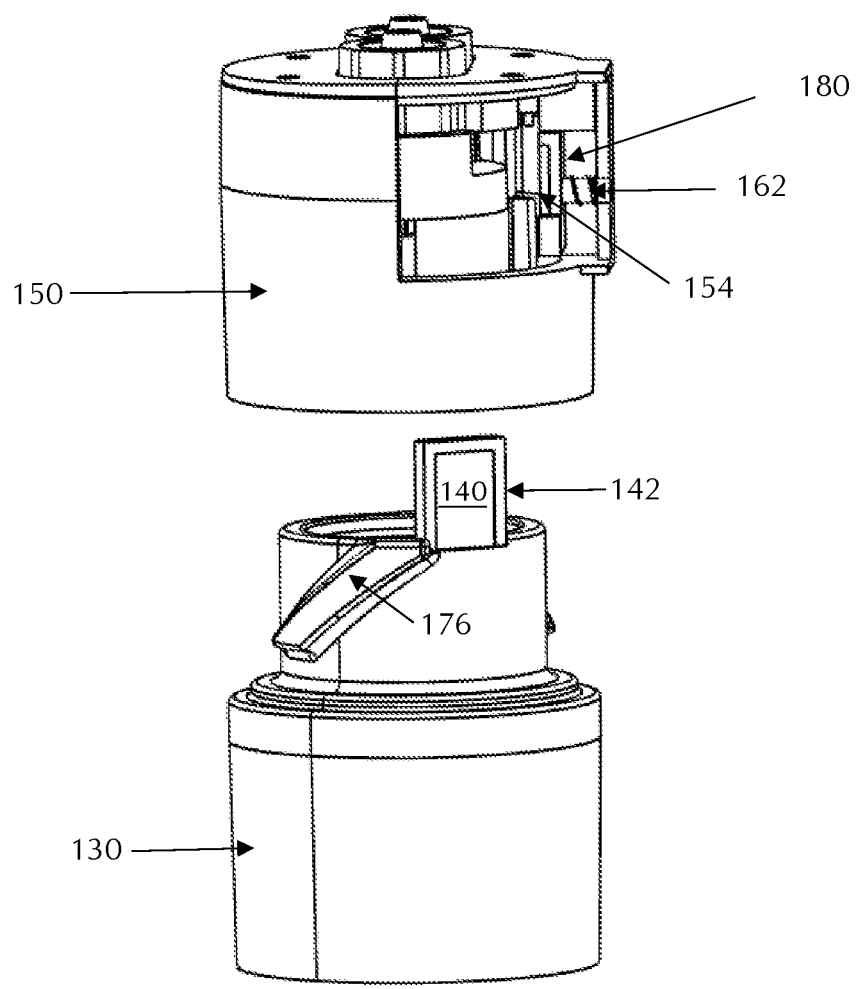

FIGS. 21A-21E depict an exemplary method of interconnection of filter cartridge 130 to manifold 150. As shown in the Figures, a portion of the outer wall of the manifold has been partially cutaway to more clearly depict the movement of the resilient blocking mechanism as the filter cartridge is moved toward the INSTALLED position. FIG. 21A shows the filter cartridge 130 prior to axial insertion within sump 156 of manifold 150. Alignment lugs or threads 176 are positioned for receipt within alignment channel 184 of the manifold 150, such that upon rotation, cartridge 130 is urged into sump 156 in the direction of arrow 194.

As best seen in FIGS. 21B and 21C, during rotation of filter cartridge 130 in the direction of arrow 190, magnet 154 is positioned for alignment in close proximity with filter cartridge magnet 140 when thread 176 approaches the end of the sump alignment channel 184. When filter magnet 140 and manifold magnet 154 are in alignment and brought into an effective working distance, the result is a repulsion force between the two magnets. The polymagnets are correspondingly coded, such that the polymagnets generate a repulsion force to cause blocking mechanism 180 and manifold magnet 154 to move radially (with respect to the longitudinal axis of the sump) into recess 182 and out of the path of filter cartridge radial thread 176, shown in the direction of arrow 192 (FIG. 21D). Position stop 180 is normally biased in an extended position by spring 162, such as a coil spring, disposed within recess 182, such that when filter magnet 140 and manifold magnet 154 are in alignment, the repulsion force generated is sufficient to overcome the spring force and compress spring 162, thus retracting position stop 180 and clearing a path for lugs 176 to complete rotation of filter cartridge 130.

Figure 21E:
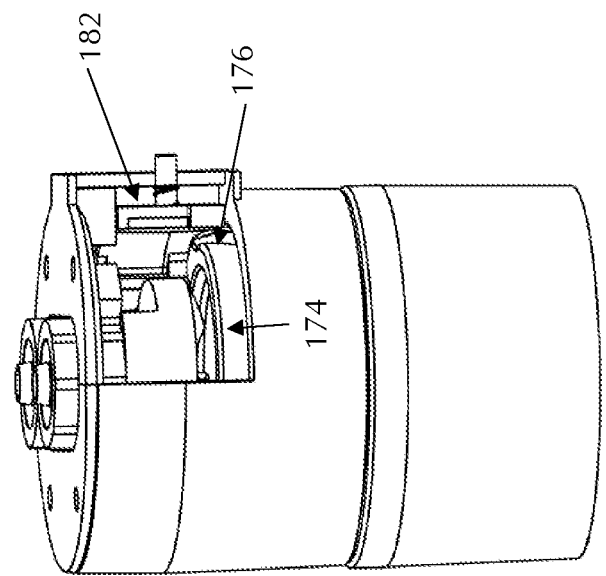
Figure 21D:
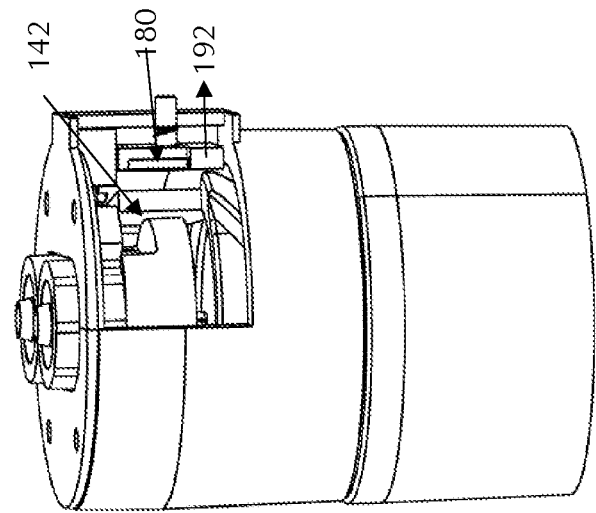

When the filter cartridge is in an INSTALLED position, as shown in FIG. 21E, the outer surface of annular collar 174 is in contact with blocking mechanism 180 to maintain the blocking mechanism in a retracted position, such that when the filter cartridge is rotated in an opposite direction and removed, spring 162 is permitted to extend as thread 176 passes by.

Only filter cartridges including a "coded" polymagnet having a pre-designed or predetermined polarity profile which corresponds to that of the polymagnet in the filter manifold will operate correctly, i.e., remove blocking mechanism 180 to allow for filter cartridge installation. Therefore, only genuine replacement filter cartridges from the manufacturer or its licensee will be authenticated. This limits the counterfeiting market, which is especially important with respect to the safety of consumers who believe that they may be able to save money by purchasing a non-authentic replacement filter cartridge which mechanically may connect to a mating manifold, but may nonetheless not have an enclosed filter media which is as effective for removal of contaminants or impurities in water as that of the filter media of a genuine replacement part.

In still another embodiment, as shown in FIGS. 22-29, inclusive, the magnetic force generated by the coded polymagnets is used to actuate a latch mechanism for the filter cartridge as the cartridge is inserted into a mating filter manifold. Enhanced filter authentication is achieved in that a non-OEM filter cartridge would not include the required complementary correlated magnetic structure to generate sufficient magnetic force and thus would be unable to actuate the latch mechanism to secure the filter cartridge against pressurized fluid flow.

Figure 22:
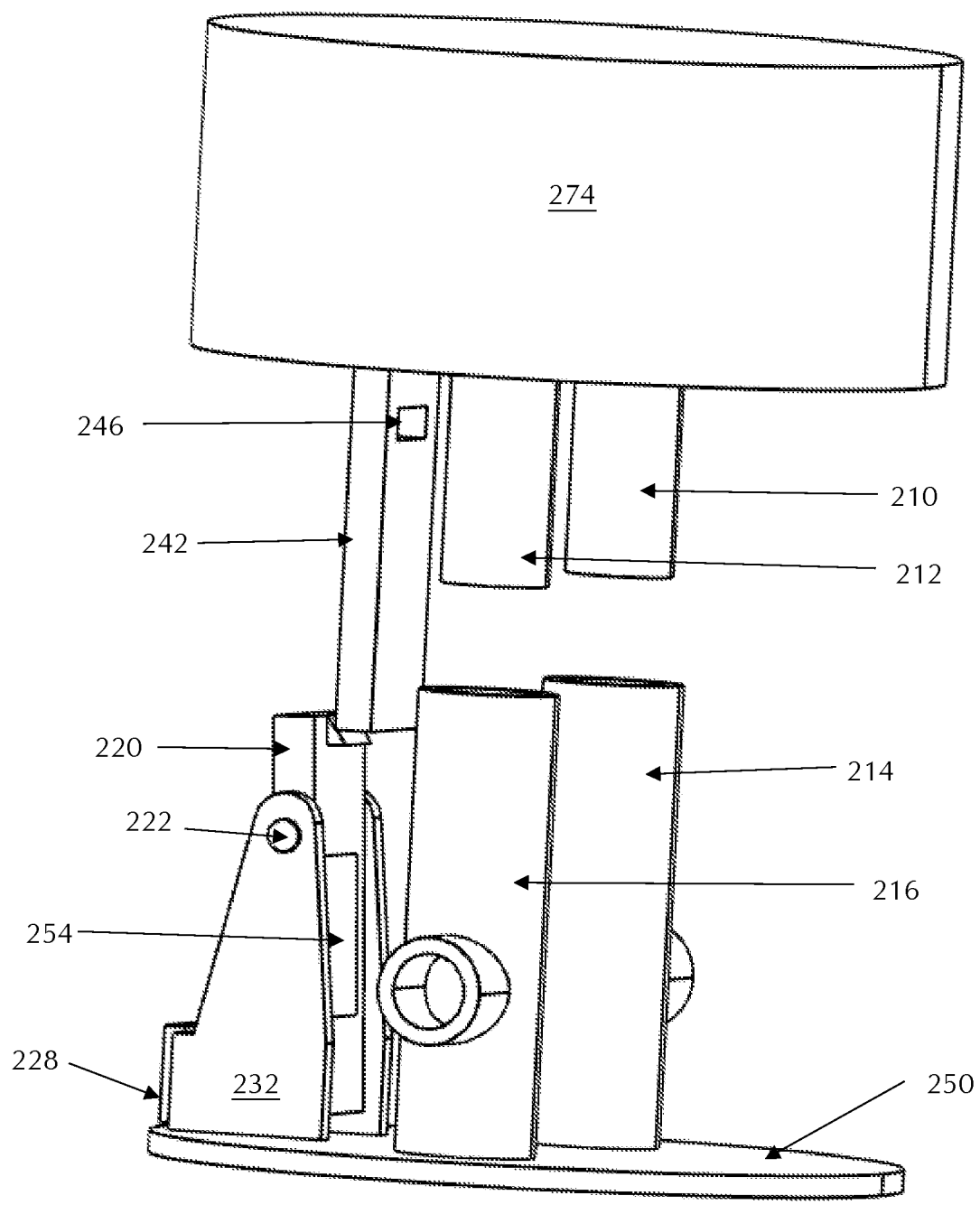
FIG. 22 depicts a perspective view of another embodiment of a filter interconnect according to the present invention, where the coded polymagnets are used to actuate a mechanical latch mechanism to allow for filter cartridge installation into a mating manifold.
Figure 23:
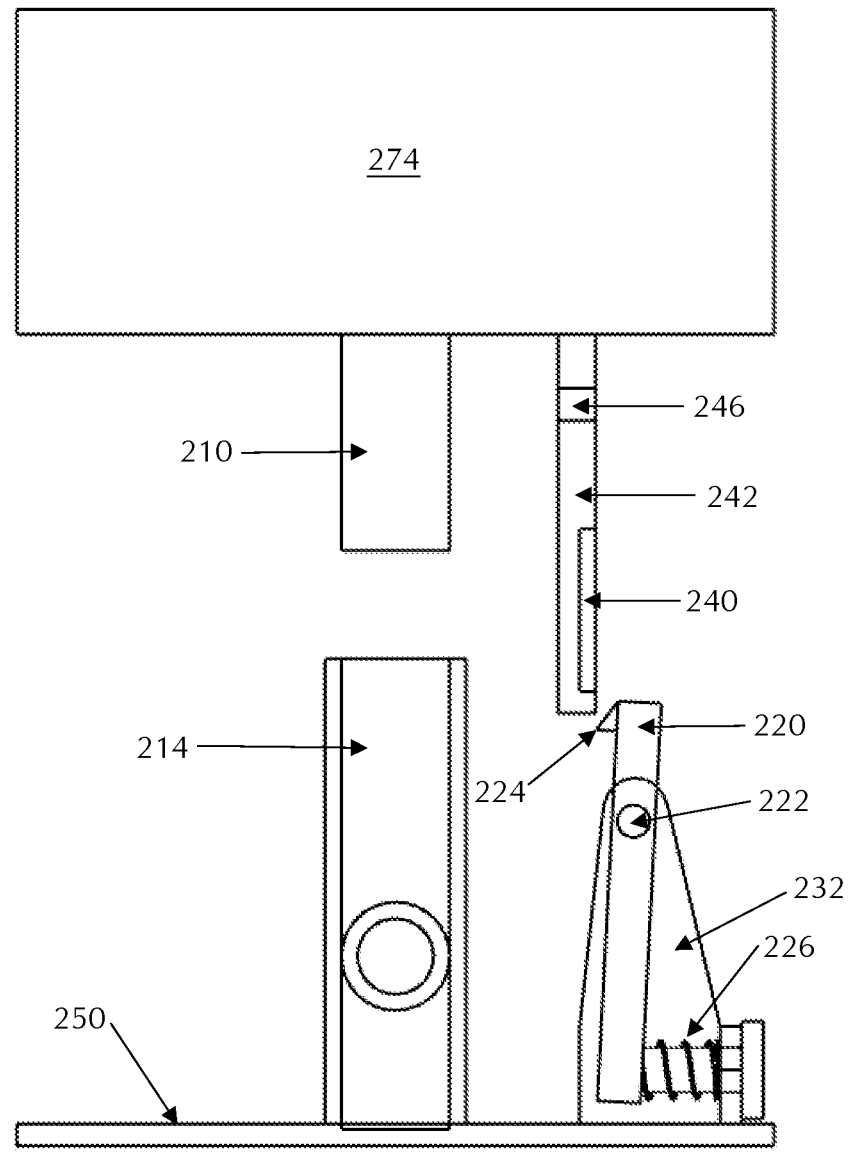
FIG. 23 depicts a side plan view of the filter interconnect of FIG. 21, in partial cross-section, to show the position of the filter cartridge magnet.
Figure 25:
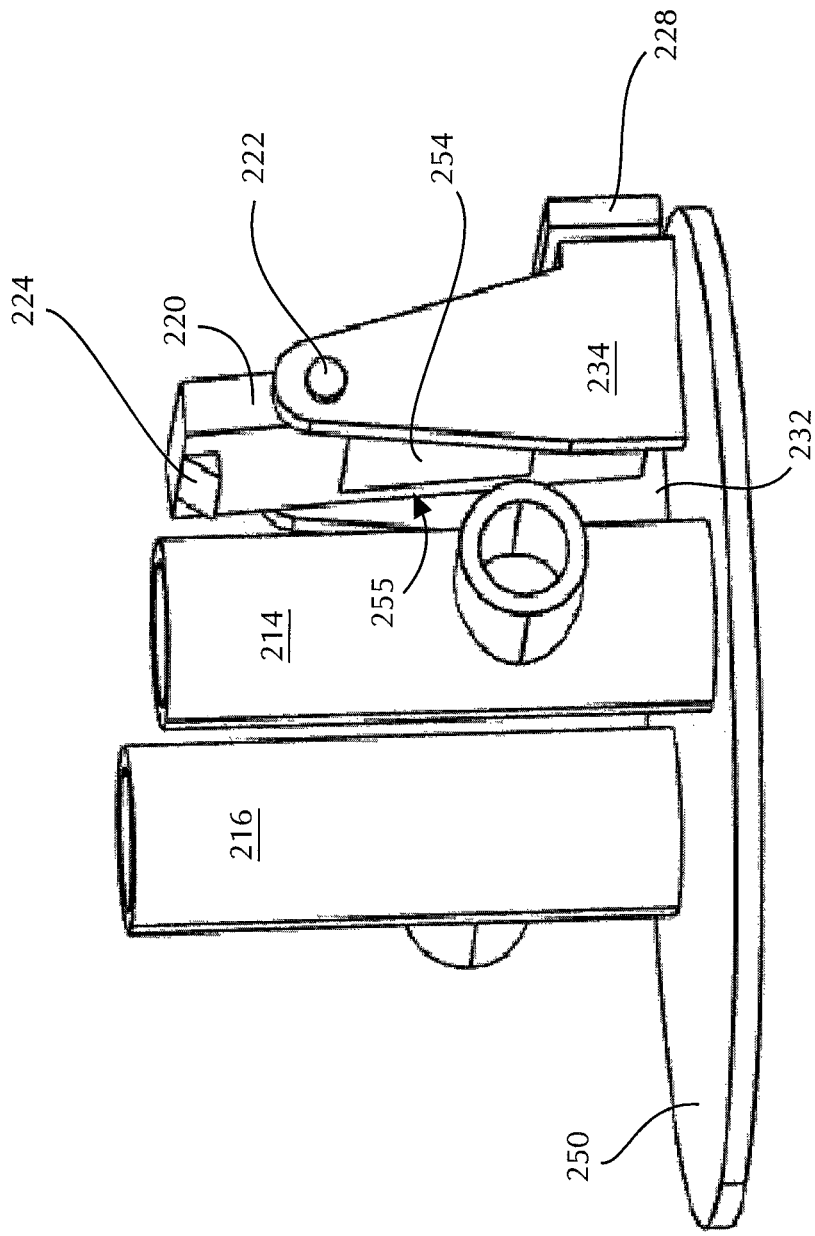
FIG. 25 depicts a perspective view of the filter manifold and latch mechanism of FIG. 22.
Figure 26:
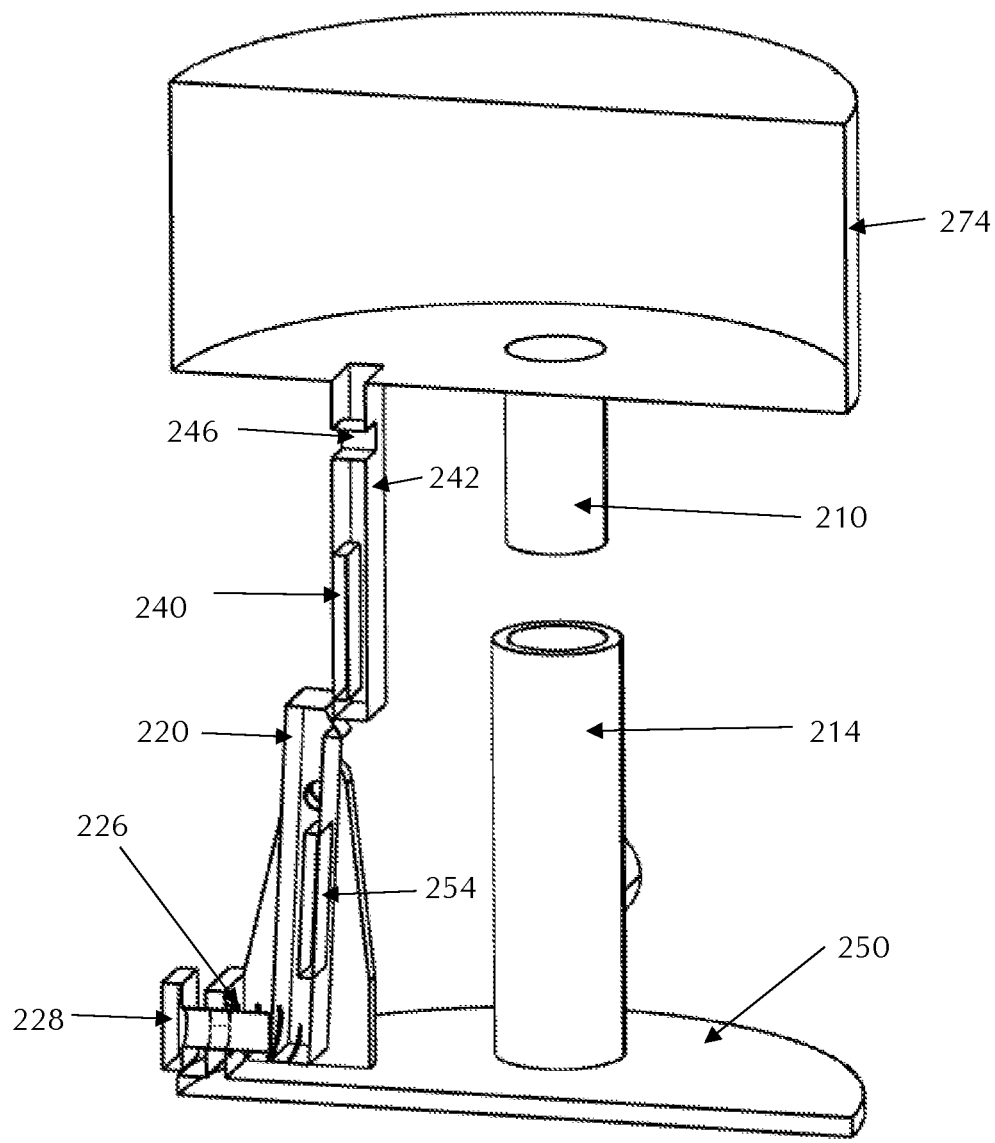
FIG. 26 depicts a perspective, cross-sectional view, of the filter interconnect of FIG. 22, prior to installation of the filter cartridge.
Figure 27:
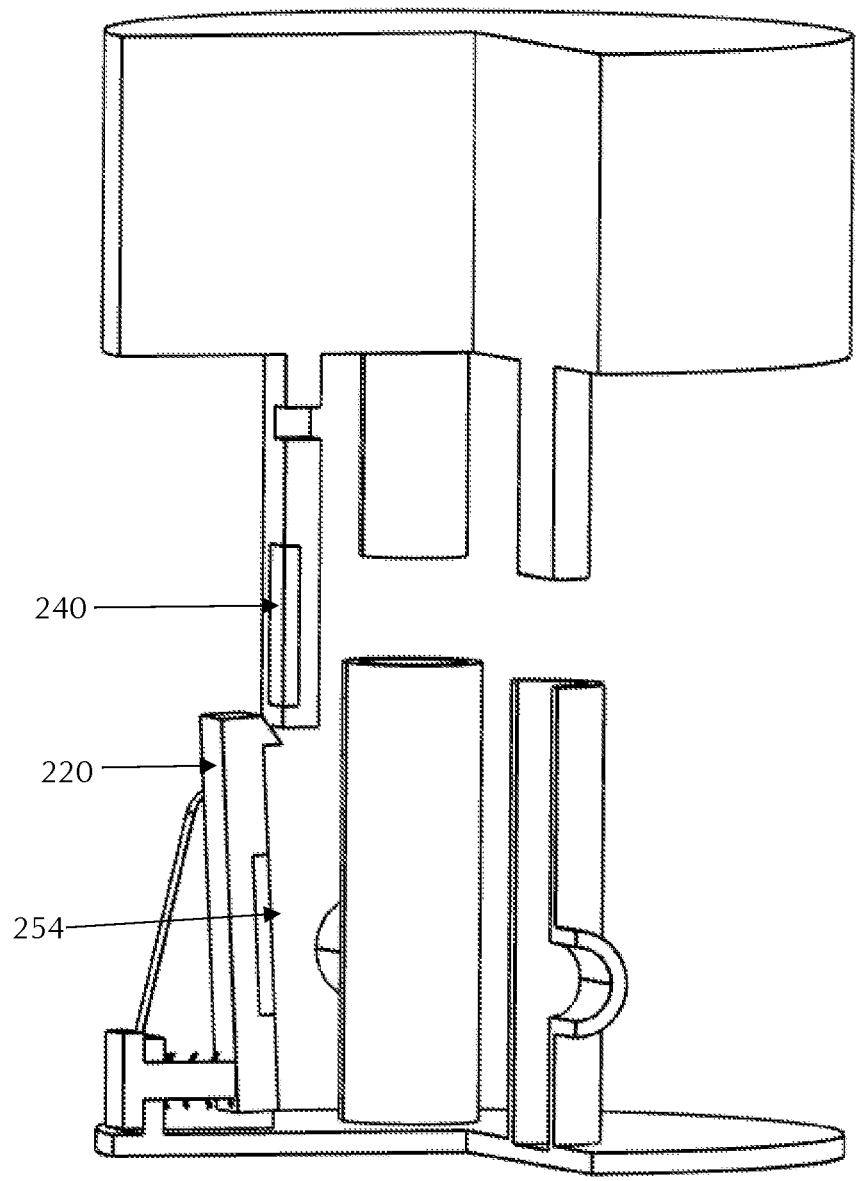
FIGS. 27-29 depict perspective, cross-sectional views of the filter interconnect of FIG. 21, showing the methods of installation and removal of the filter cartridge.

As best seen in FIG. 25, a latch 220 is attached to or at least partially-integral with the filter manifold 250 via axially-extending supports 232, 234 coupled to a pin or shaft extending transversely between opposing sides of the latch and is normally biased in a first, open position to allow a filter cartridge to be inserted within the sump. Latch 220 is pivotable about a first pivot axis or shaft 222 extending transversely between supports 232, 234 to allow for attachment of the cartridge. In the embodiment shown, latch 220 extends substantially upwards, off-axial center of the manifold 250 adjacent fluid ingress and egress stanchions 214, 216, and includes a first magnetic structure comprising a coded polymagnet 254 disposed therein and having a surface 255 facing inward in the direction of stanchions 214, 216 (FIGS. 22, 25). Magnet 254 may be a correlated magnet having a plurality of magnetic field emission sources having positions and polarities relating to a predefined spatial force function that corresponds to a predetermined alignment of the magnetic field emission sources. As shown in at least FIG. 23, proximate the first magnetic structure 254 at an upper portion of the latch is a projection or protrusion 224 which is adapted to mate with a corresponding notch or cutout 246 in filter head 274 when the filter cartridge is inserted into the manifold and the latch is in the closed, latching position. Latch 220 is normally biased in a first, open position by return spring 226, or any other suitable resilient member such as a rubber grommet, torsion spring or any other form known in the art.

Figure 24:
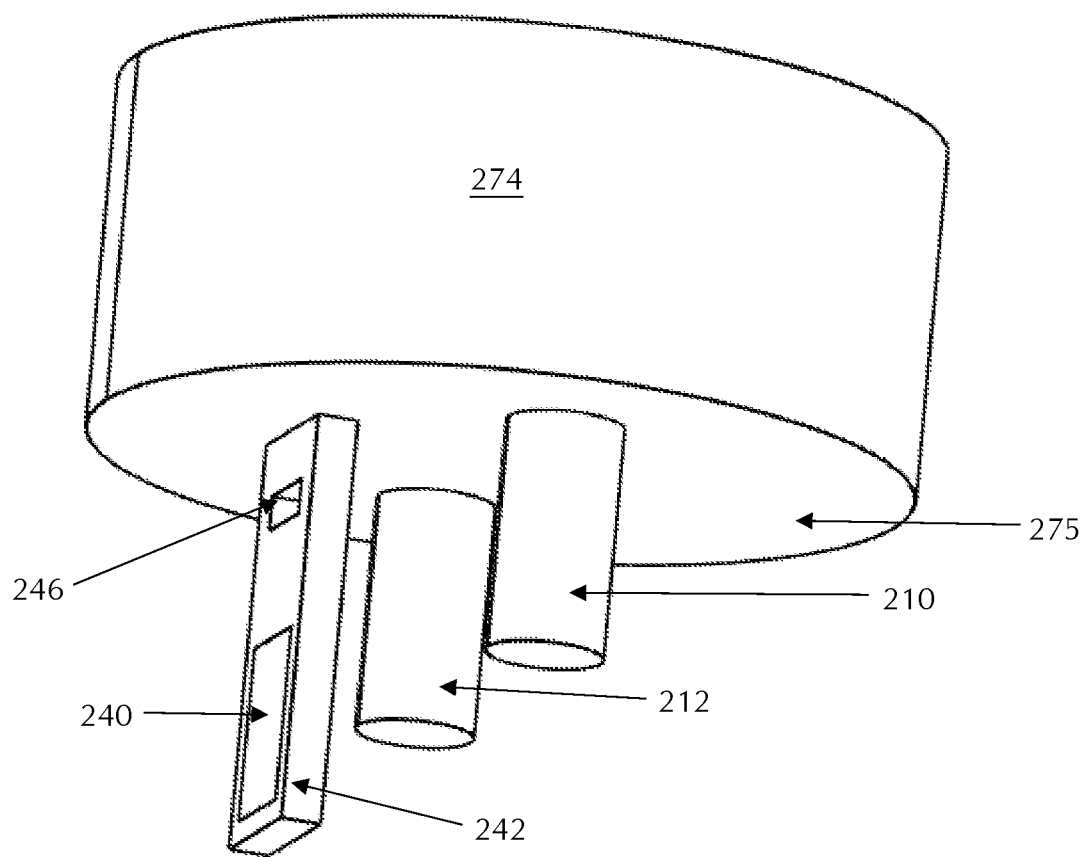
FIG. 24 depicts a perspective view of the filter head of the filter cartridge of FIG. 22.
Figure 28:
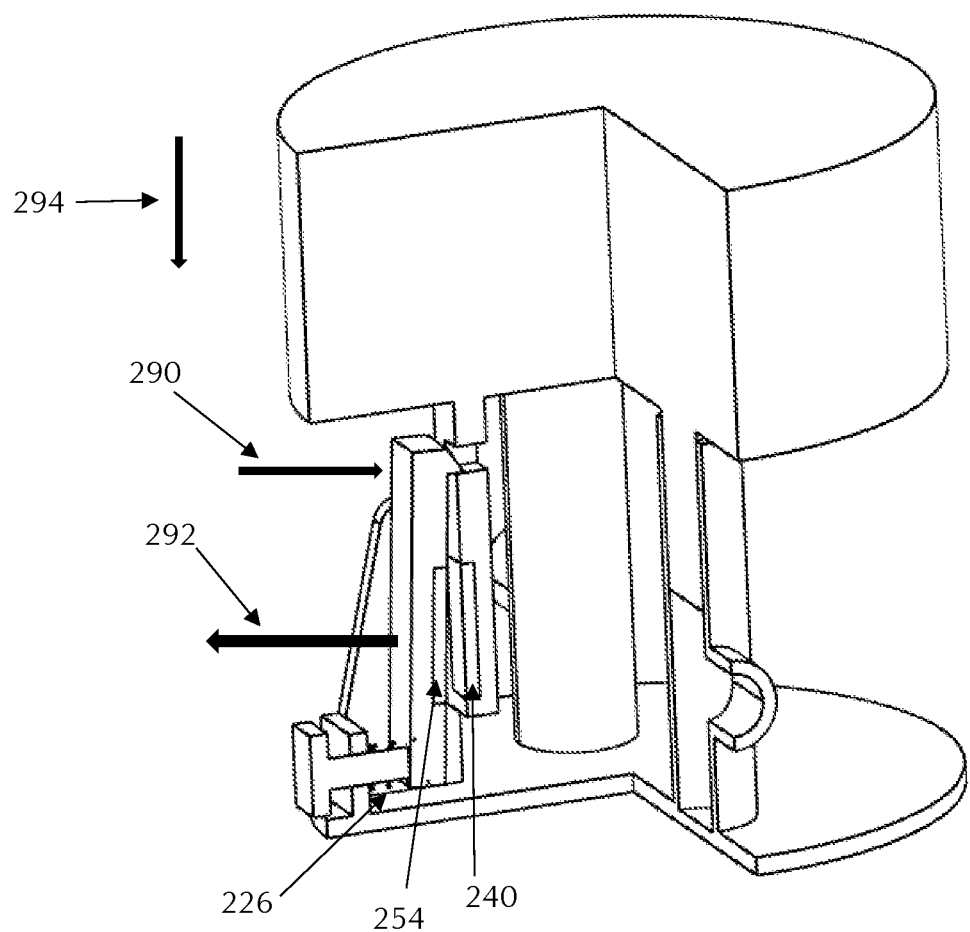

As shown in FIG. 24, filter head 274 includes fluid ingress and egress ports 210, 212 for insertion into ingress and egress stanchions 214, 216 of the mating manifold, and a magnetic structure or tab 242 extending from a top surface 275 of the filter head, radially offset from ports 210, 212 and extending parallel to the longitudinal axis of the filter cartridge body. Disposed within tab 242 is a second, corresponding polymagnet 240 having a radially outwardly-facing surface that presents in a direction away from a center axis of the filter head so as to be in close proximity with the latch when the filter cartridge moves toward the INSTALLED position. Polymagnet 240 has a plurality of complementary magnetic field emission sources having positions and polarities relating to a predefined spatial force function that corresponds to a predetermined alignment of the magnetic field emission sources, such that when the filter cartridge is inserted into the manifold 250, as shown in FIG. 28, the "keyed" polymagnets 240, 254 become aligned when in proximity (in-phase generating a repulsion force), and causing the latch 220 to pivot about pivot axis 222 to the second, latching position in the direction of arrow 290, overcoming the force of return spring 226 and thereby causing the latch protrusion 224 to extend into filter head notch or cutout 246 proximate polymagnet 240, locking the filter cartridge in an INSTALLED position against pressurized fluid flow.

Figure 29:
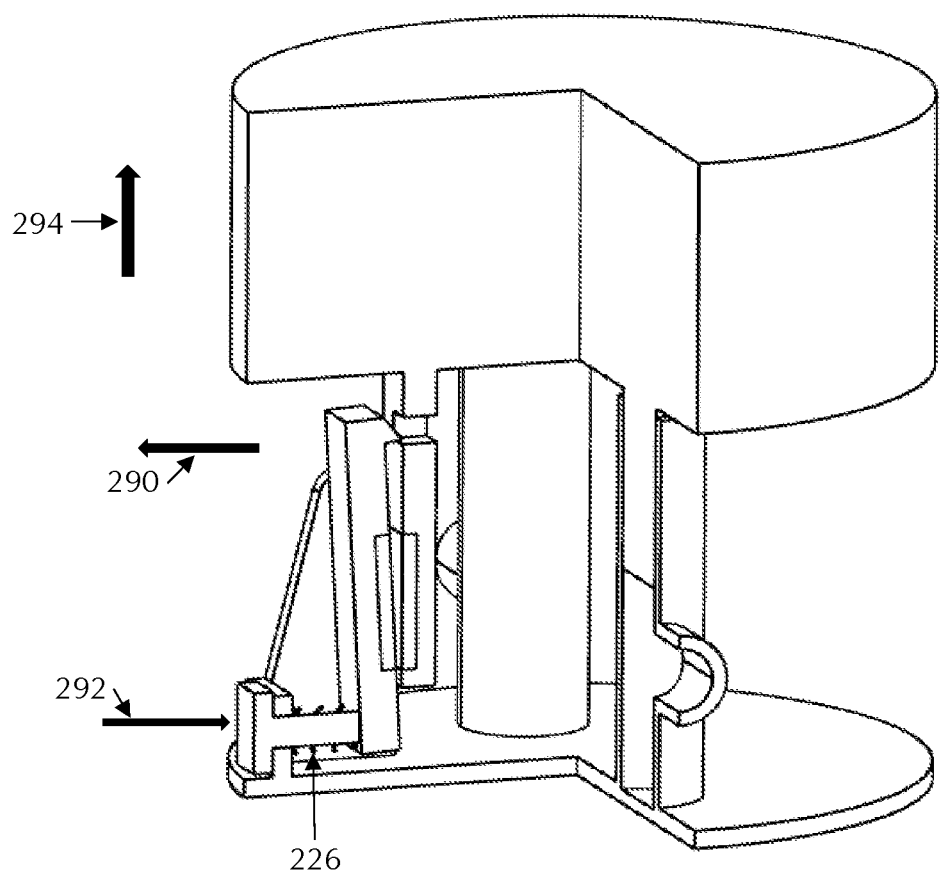
Figure 30:
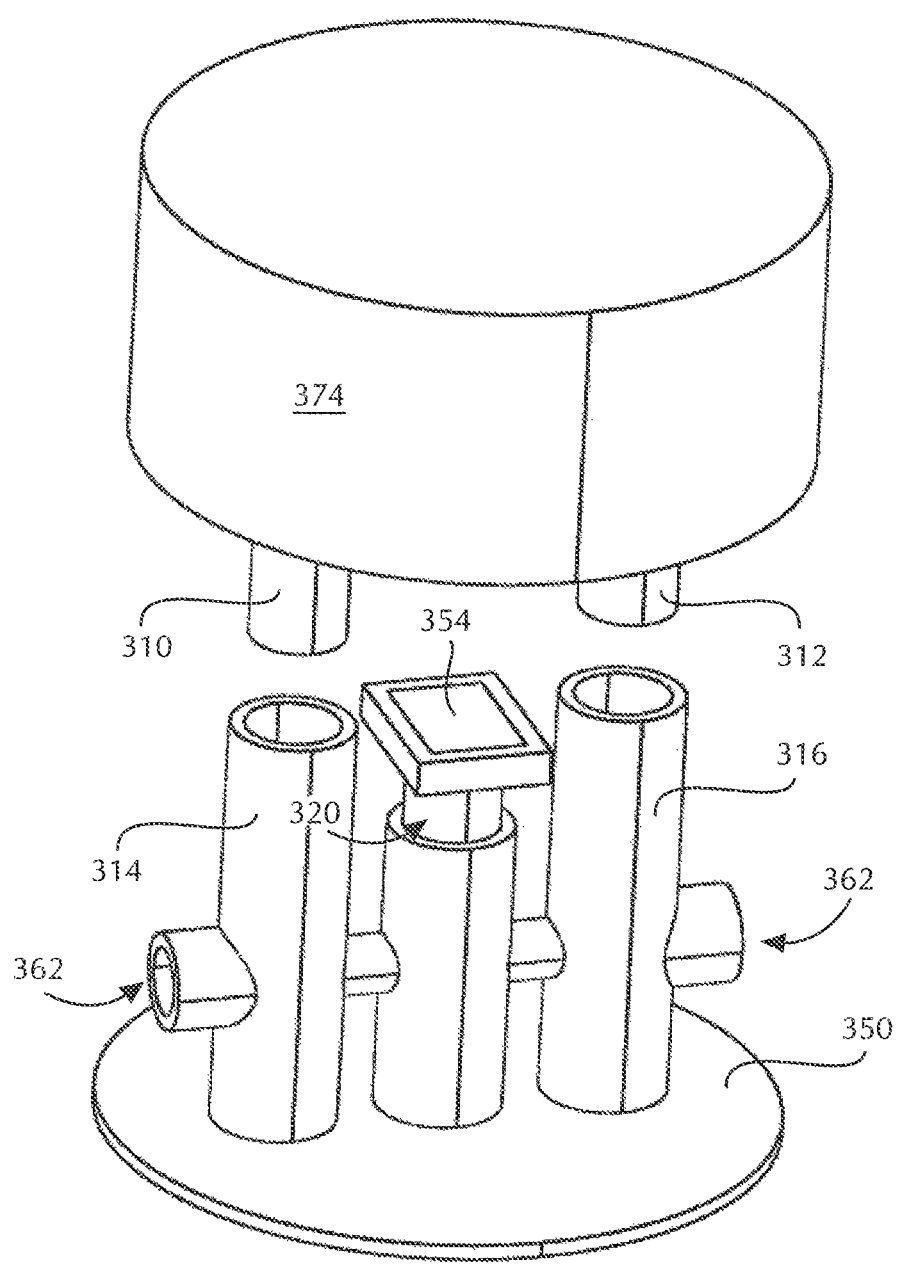
FIG. 30 depicts another embodiment of a filter interconnect according to the present invention, where the coded polymagnets are used to actuate a bypass valve upon proper filter cartridge installation into a mating manifold to allow for filtered egress fluid flow.

To remove the filter cartridge, as best seen in FIG. 29, a latch release button 228 is manually actuable by an end user in the direction of the center axis of the manifold (direction of actuation is shown by arrow 292), overcoming the magnetic repulsion force between magnets 240, 254 to compress the return spring 226 and causing latch 220 to pivot about pivot point 222 in an opposite direction toward the first, open position and thereby pulling latch protrusion 224 away from the filter head 274 and notch 246, and allowing for removal of the filter cartridge. As the filter cartridge is removed, magnets 240, 254 move out of phase, decreasing the repulsion force and permitting latch 220 to be reset to the biased, open position by spring 226.

In that correlated magnets are characterized by dense and tunable magnetic fields, it is possible to specifically engineer force curves with higher force at shorter working distances, such as those shown in FIGS. 22-29. A conventional magnet would be unable to produce sufficient magnetic repulsion force over such a short effective distance without significantly increasing the physical size of the magnet, which would present design feasibility issues. Only filter cartridges including a "coded" polymagnet having a pre-designed or predetermined polarity profile which corresponds to that of the polymagnet in the filter manifold will operate correctly, i.e., generate a sufficient repulsion force to pivot the latch into a locked position to secure the filter cartridge. Unless the polarity arrays or patterns of the correlated magnets are correspondingly "keyed", the magnetic communication will not actuate the latch. As such, only a genuine OEM filter cartridge will function and a non-OEM or counterfeit filter cartridge will be non-operational. While the embodiment of the present invention shown herein depicts a pivotal movement of the latch, other means of engaging the latch are not precluded, such as by translational means.

Figure 31:
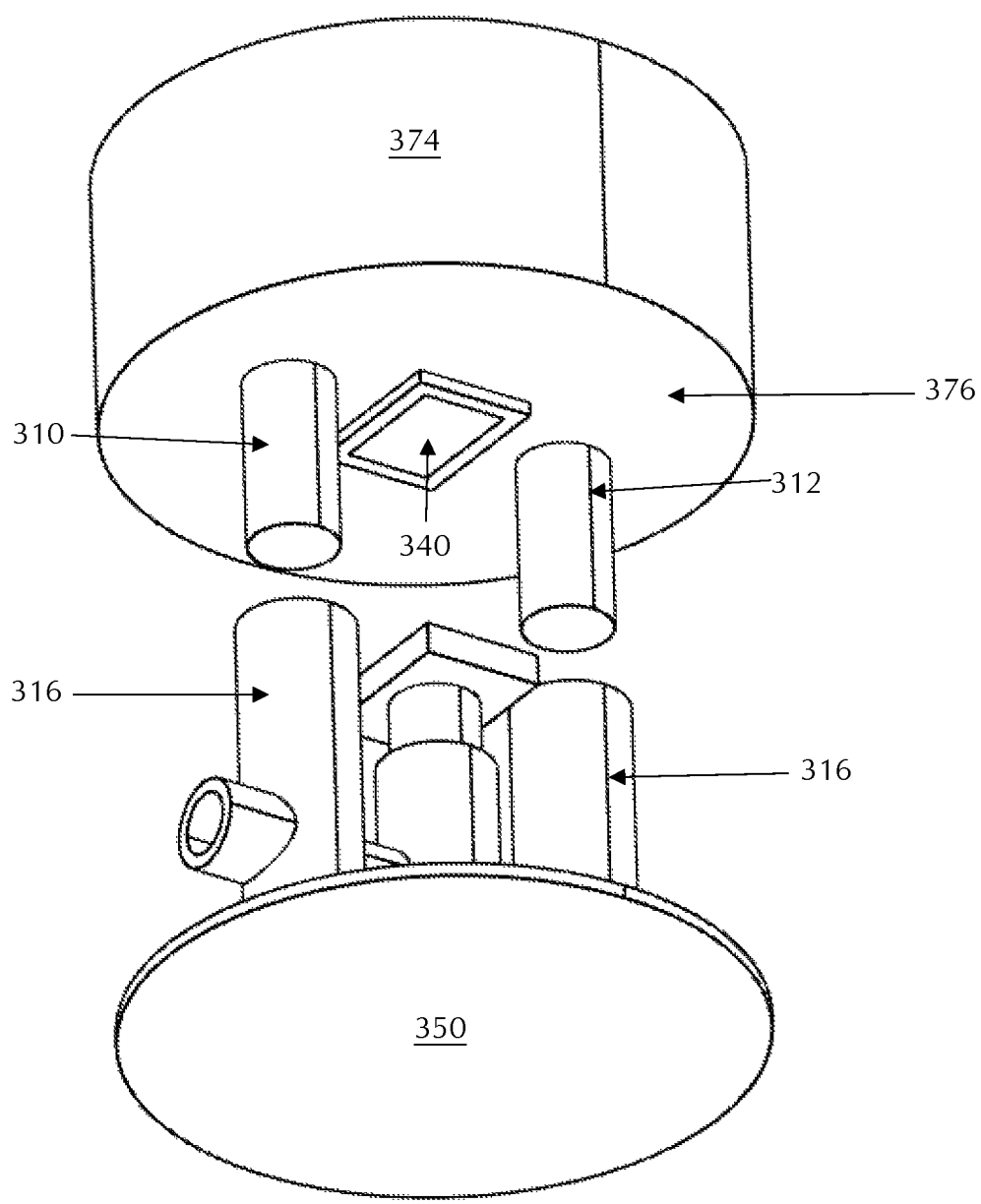
FIG. 31 depicts a bottom perspective view of the filter interconnect of FIG. 30.
Figure 32:
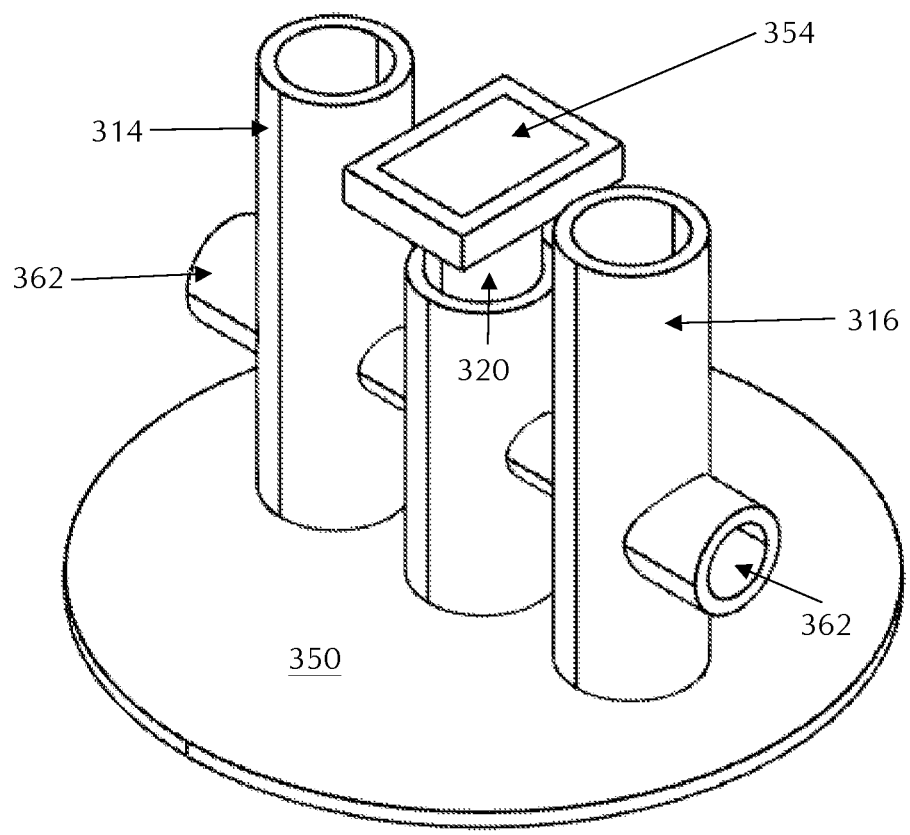
FIG. 32 depicts a perspective view of the filter manifold of FIG. 30.
Figure 33:
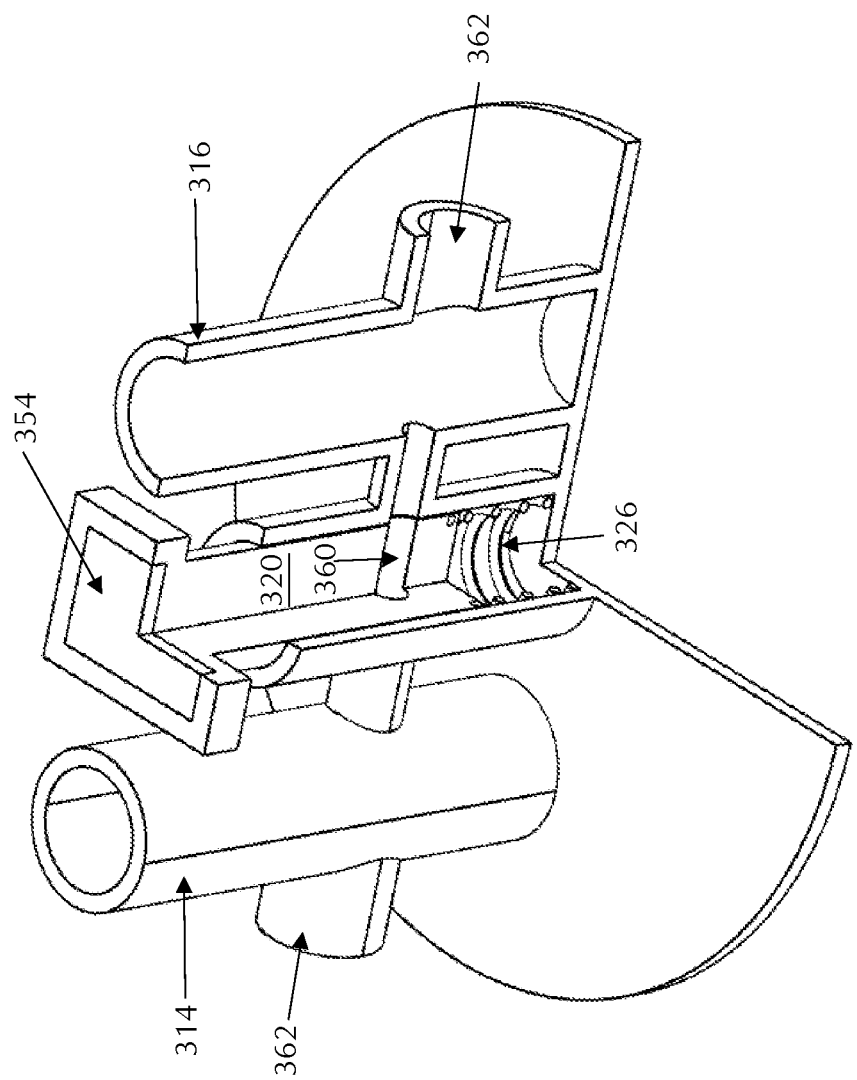
FIG. 33 depicts a partially cutaway view of the filter manifold of FIG. 32, showing the positions of the bypass channel and bypass spring in the "home" position.
Figure 34:
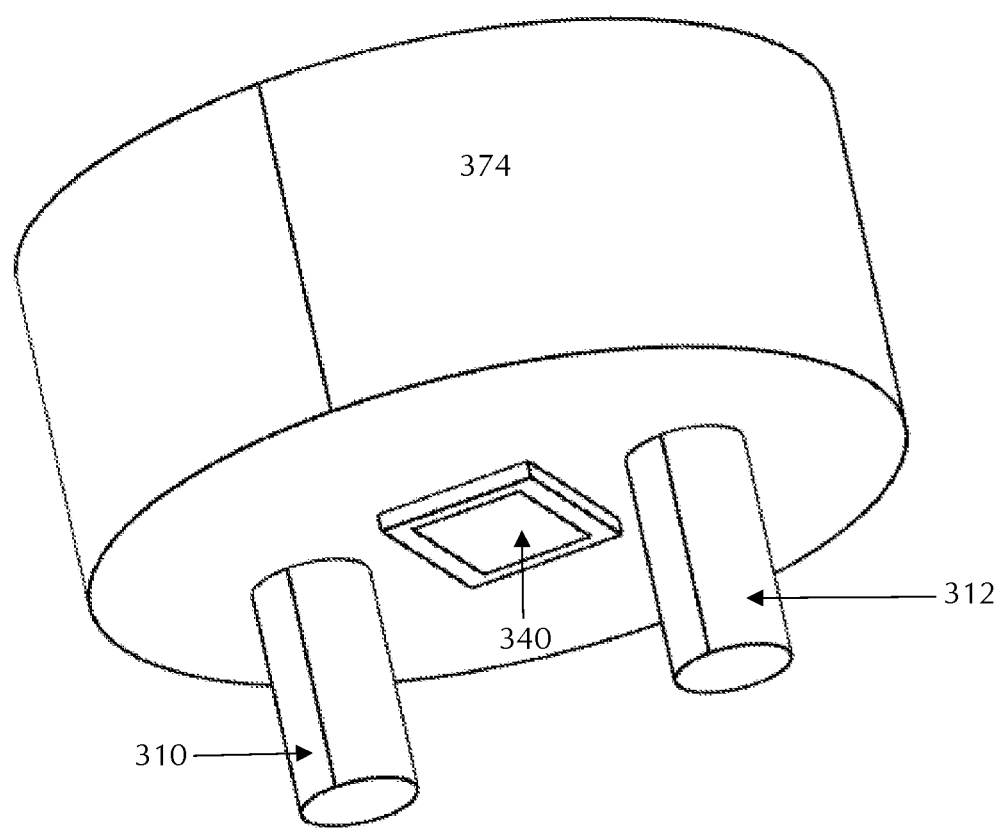
FIG. 34 depicts a perspective view of the filter head of the filter cartridge of FIG.
Figure 35:
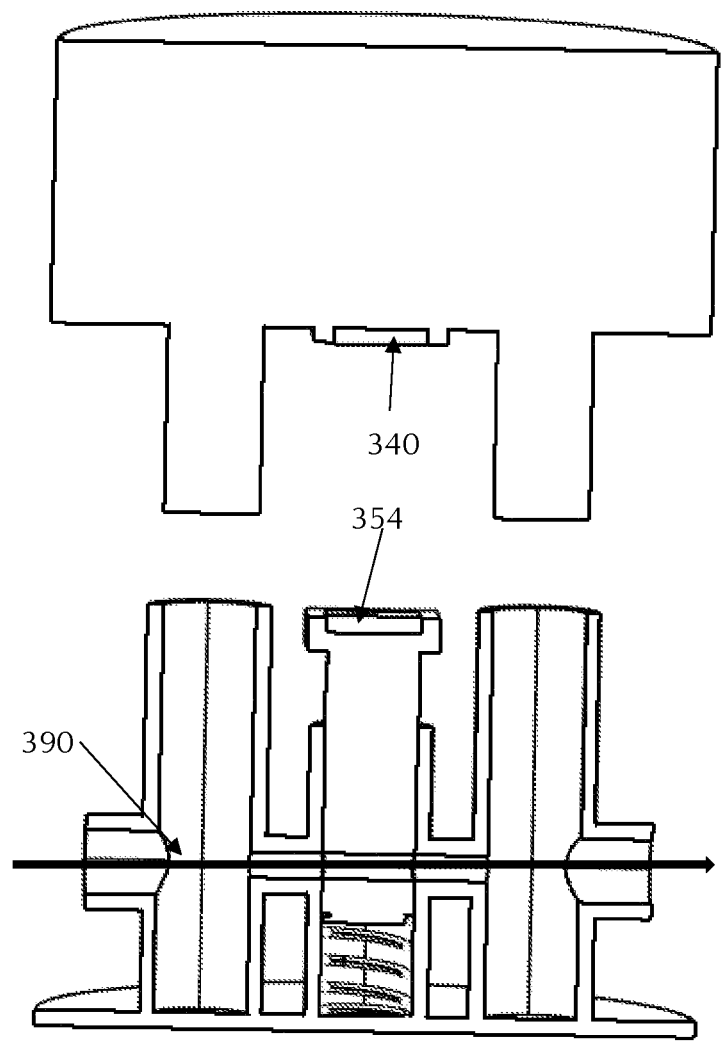
FIG. 35 depicts a side, cross-sectional plan view of the filter interconnect of FIG. 30 in an UNINSTALLED position and the valve in bypass mode.

In yet another embodiment, as shown in FIGS. 30-39, inclusive, the magnetic force generated by the coded polymagnets is used to actuate a bypass valve as the filter cartridge is inserted into a mating filter manifold, allowing for filtered egress fluid flow. As best seen in FIG. 32, filter manifold 350 includes fluid ingress and egress stanchions 314, 316 with a bypass valve 320 disposed therebetween for permitting fluid to flow transversely between the stanchions without passing through (thus, bypassing) the filter cartridge, as shown in FIG. 35. Bypass valve 320 includes a coded polymagnet 354 (i.e., bypass magnet) connected to or disposed therein, for aligning with a mating or paired polymagnet disposed in or on a filter cartridge during installation. The magnets have a plurality of complementary magnetic field emission sources having positions and polarities relating to a predefined spatial force function that corresponds to a predetermined alignment of the magnetic field emission sources, such that a magnetic repulsion force is generated when the magnets are in close proximity. When no filter cartridge is installed, or a non-OEM or counterfeit filter cartridge (without the corresponding mating or paired polymagnet) is installed, the bypass valve will remain in a biased open or "home" position, allowing fluid ingress to flow directly through aperture 360 formed in bypass valve 320 between ingress stanchion 314 and egress stanchion 316 (FIGS. 33 and 35). In this manner, a user will still be able to access unfiltered water. Bypass valve 320 is actuable in an axial direction upon axial insertion of a filter cartridge having a mating or paired polymagnet into an alignment position, against the force of valve or bypass spring 326 or similar resilient member which normally biases the bypass valve into the "home" position.

Figure 36:
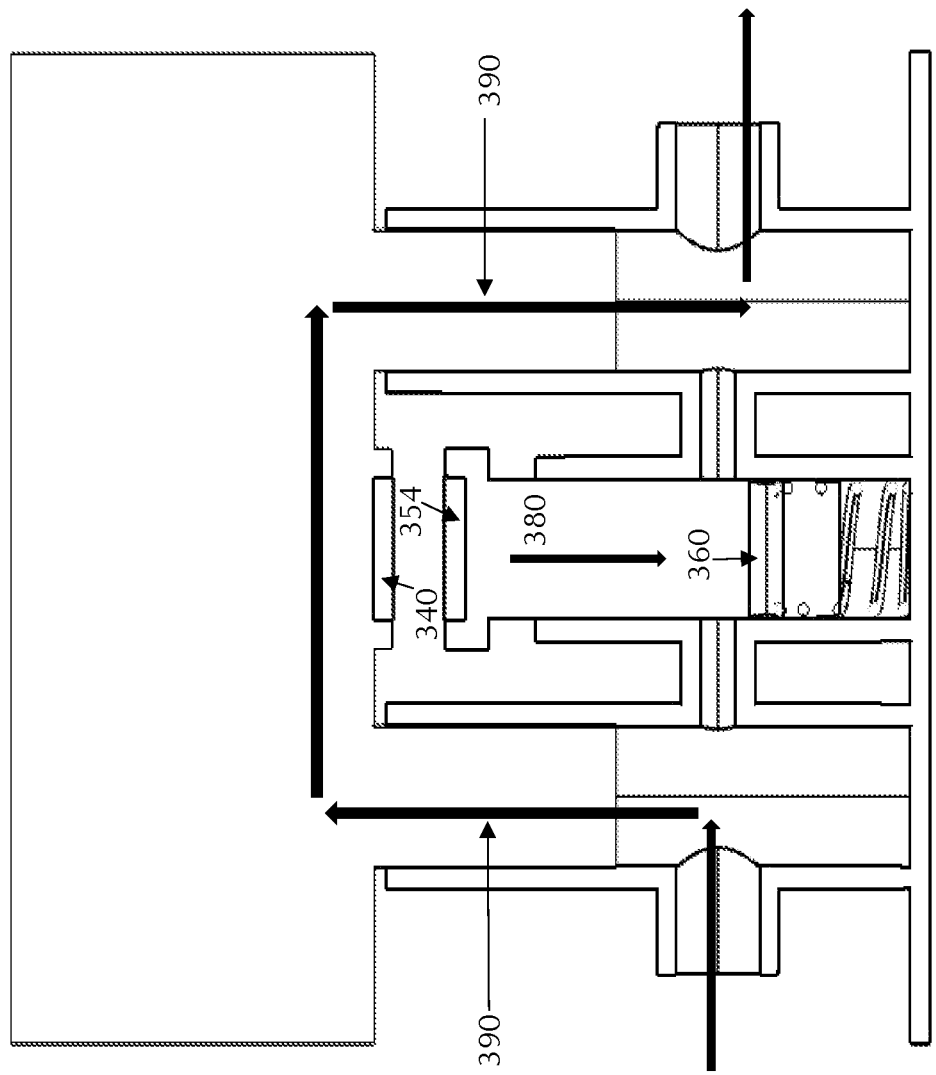
FIG. 36 depicts a side, cross-sectional plan view of the filter interconnect of FIG. 30 in an INSTALLED position and the valve actuated.

As seen FIG. 31, filter head 374 includes fluid ingress and egress ports 310, 312 for insertion into manifold ingress and egress stanchions 314, 316, and disposed between the ports and approximately axially-centered is a second, corresponding coded polymagnet 340 (i.e., filter magnet) embedded in a top surface 376 of the filter head. It should be understood by those skilled in the art that filter head 374 is integral with or connected to a filter cartridge (not shown, for clarity) having a body and forms a fluid tight seal with the filter cartridge body. When the filter cartridge is inserted into the sump, as shown in FIG. 36, the "keyed" polymagnets become aligned when in proximity (in-phase generating a repulsion force), causing the bypass valve 320 to actuate to a second, closed position in the direction of arrow 380, overcoming the force of valve spring 326. As valve 320 is pushed against resilient spring 326, aperture 360 (formed in valve 320) shifts away from channel 362, thus closing channel 362 to water flow. With the bypass valve in a closed position, channel 362 is completely cut off by valve 320 and thus the ingress fluid flow path is altered, as shown by arrow 390 in FIG. 36, such that the fluid flows through ingress stanchion 314 and port 310, through filter media (not shown) in the filter cartridge, and filtered fluid flows back out of the filter cartridge through egress port 312 and egress stanchion 316.

Figure 37:
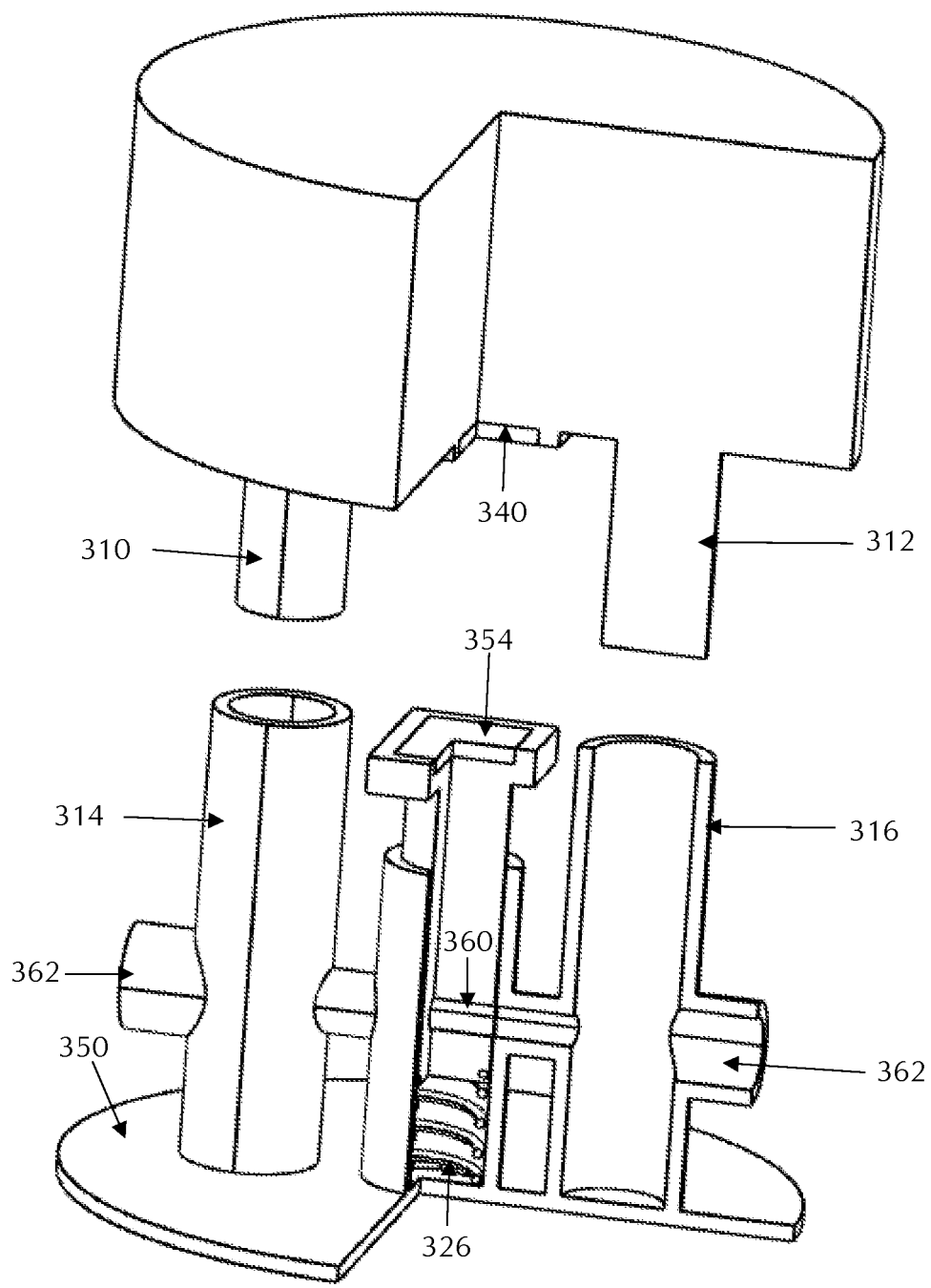
FIGS. 37-39 depict perspective, partially cross-sectional views of the filter interconnect of FIG. 30, showing the method of installation.
Figure 38:
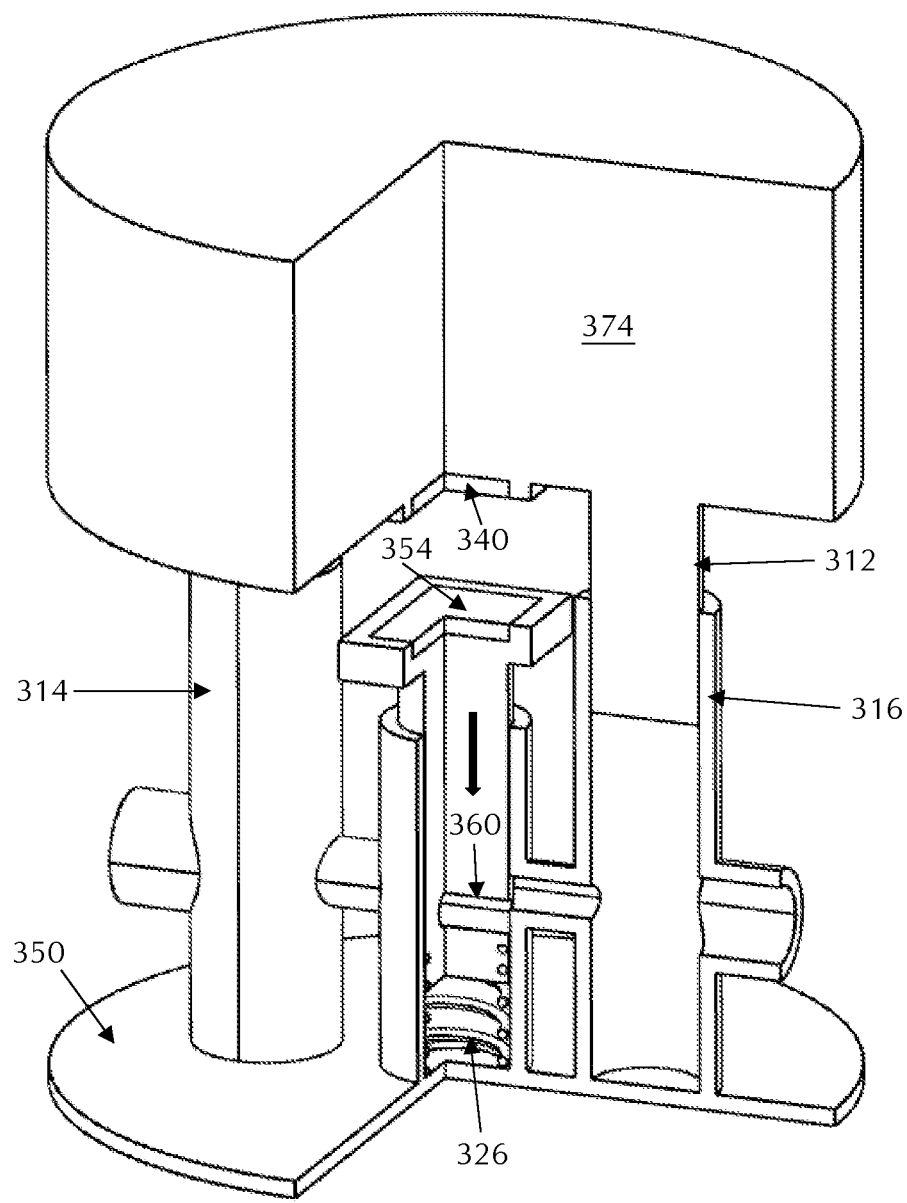
Figure 39:
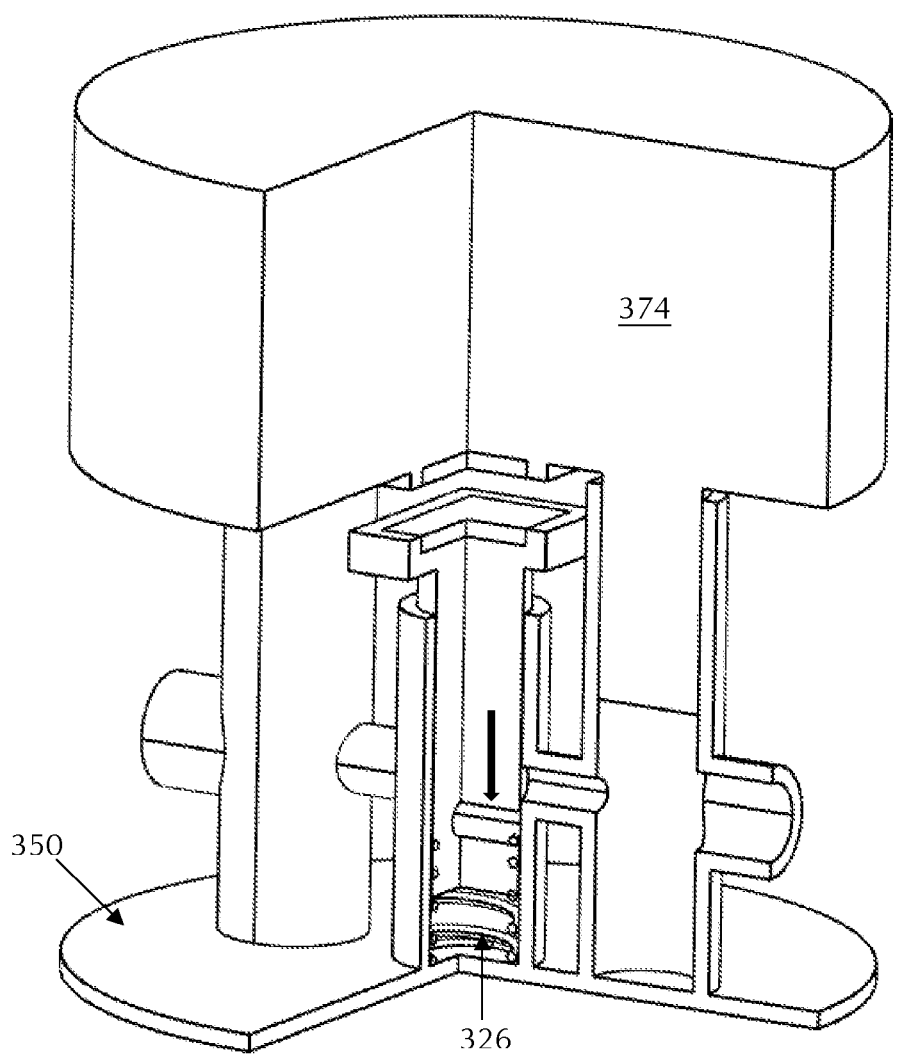

FIGS. 37-39 depict an exemplary embodiment of a method of installation of a filter cartridge to actuate a bypass valve in accordance with the present invention. The filter head and filter manifold are shown in partial cross-section to more clearly depict the positions of the corresponding polymagnets 340, 354, bypass valve 320 and bypass spring 326, respectively, as the filter cartridge is moved toward an INSTALLED position. As shown in FIG. 37, prior to filter cartridge installation, bypass magnet 354 is in a biased "home" position, and the valve is in bypass mode. As the filter cartridge is inserted into the sump and the "keyed" polymagnets become aligned when in proximity, as shown in FIG. 38, the bypass magnet 354 begins to repel in the direction of the filter manifold as a result of the magnetic repulsion force between the magnets 340, 354 becoming sufficient to overcome the force of valve spring 326, and the valve 320 starts to block the bypass. When the filter cartridge is in a fully-installed position, as shown in FIG. 39, bypass valve 320 has actuated to the second, closed position, thereby completely blocking the bypass and allowing fluid to flow through the filter cartridge.

In one or more embodiments, manifold 350 may include a translatable position stop blocking axial motion of bypass valve 320, such that the valve cannot be manually depressed by a protruding portion of a non-OEM filter cartridge. In such an embodiment, the position stop may be translatable such as through a magnetic shear force generated between the existing (or additional) coded polymagnet pairs.

Thus, the present invention achieves one or more of the following advantages. The present invention provides an improved filter interconnect which utilizes correlated magnetism to provide the initial drive to engage downstream system functionality, allowing for a higher degree of control and flexibility over the timing and actuation of downstream system function. By utilizing magnetic repulsion, the present invention further allows for non-electronic and non-contacting actuation of a downstream electronic system, which overcomes the technical hurdles of using electronic interconnects of the prior art which present issues of fluid reaching the electronic components, and provides an improved filter interconnect which prevents leaking by dissociating the initial filter cartridge installation from the actuation of an upstream and/or downstream valve. The present invention further has applications in alternate methods of filter authentication and anti-counterfeiting.

In the embodiments described above, a magnetic repulsion force is generated when a set of "keyed" or coded polymagnets are aligned and brought into an effective working distance, which results, in some instances, in the movement and removal of a blocking mechanism or position stop which normally prevents a filter cartridge from being secured within a manifold sump.

In that correlated magnets are characterized by dense and tunable magnetic fields; it is possible to specifically engineer force curves with higher force at shorter working distances. A conventional magnet would be unable to produce sufficient magnetic repulsion force over such a short effective working distance without significantly increasing the physical size of the magnet, which would present design feasibility issues. Alignment polymagnets, such as those of the present invention, allow for attraction and repel forces to combine at polarity transitions to partially cancel normal forces and create stronger forces over shorter linear offset distances.

Another advantage of the present invention is that by utilizing corresponding coded or "keyed" polymagnets with specifically-engineered magnetic fields, the present invention further has applications in alternate methods of filter cartridge authentication and counterfeiting prevention. Only filter cartridges including a "coded" polymagnet having a pre-designed or predetermined polarity profile which corresponds to that of the polymagnet in the filter manifold will operate correctly, such as removing a blocking mechanism to allow for filter cartridge installation. Therefore, only genuine replacement filter cartridges from the manufacturer or its licensee can be authenticated. This limits the counterfeiting market, which is especially important with respect to the safety of consumers who unbeknownst to them, may purchase inferior filter cartridges which would otherwise attach to the manifold, and such replacement filter cartridges can no longer be secured to the manifold sump. This safety mechanism ensures the use of an enclosed filter media which is effective for removal of contaminants or impurities in water.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A filter cartridge, comprising:
   a housing having a body, a top surface, an axial length, and an internal cavity; and
   an annular collar circumferentially located about the housing top surface and having an outer wall, the annular collar including:
   securing lugs or threads extending radially outwards from the annular collar outer wall; and
   a correlated magnetic structure located on or within the annular collar and including a polymagnet comprising a plurality of magnetic field emission sources having positions and polarities relating to a predefined spatial force function that corresponds to a predetermined alignment of said magnetic field emission sources, the polymagnet having a radially outwardly-facing surface comprising the plurality of magnetic field emission sources that presents in a direction away from a center axis of the housing body and extends at least no further than an outward most radial extension of the securing lugs or threads;
   wherein the correlated magnetic structure is provided within a tab extending in an axial direction with respect to the annular collar, said tab positioned off-axial center of the filter cartridge body.

2. The filter cartridge of claim 1 wherein the correlated magnetic structure polymagnet radially outwardly-facing surface extends no further radially than the annular collar outside wall.

3. The filter cartridge of claim 1 wherein the securing lugs or threads include upwardly-extending ramped segments.

4. The filter cartridge of claim 1 wherein said correlated magnetic structure extends parallel to a longitudinal axis of the filter cartridge body.

5. The filter cartridge of claim 1 wherein said correlated magnetic structure is form-fit within said annular collar.

6. The filter cartridge of claim 1 wherein said correlated magnetic structure is connected to or integral with an inside wall of said annular collar.

7. The filter cartridge of claim 1 wherein said tab extends axially upwards from said annular collar.

8. The filter cartridge of claim 1 wherein said tab is form-fit within said annular collar.

9. The filter cartridge of claim 1 wherein said tab is connected to or integral with an inside wall of said annular collar.

10. The filter cartridge of claim 1 wherein said tab extends parallel to a longitudinal axis of the filter cartridge body.

11. The filter cartridge of claim 1, wherein the correlated magnetic structure generates a magnetic repulsion force when brought within close proximity to a complementary correlated magnetic structure of a filter manifold.

12. The filter cartridge of claim 1, wherein the correlated magnetic structure generates a magnetic shear force when brought within close proximity to a complementary correlated magnetic structure of a filter manifold.

13. A filter cartridge, comprising:
- a housing having a body, a top surface, an axial length, and an internal cavity; and
- an annular collar circumferentially located about the housing top surface and having an outer wall, the annular collar including:
- a receiving groove or thread within the annular collar outer wall and presenting radially outwardly; and
- a correlated magnetic structure located on or within the annular collar and including a polymagnet comprising a plurality of magnetic field emission sources having positions and polarities relating to a predefined spatial force function that corresponds to a predetermined alignment of said magnetic field emission sources, the polymagnet having a radially outwardly-facing surface comprising the plurality of magnetic field emission sources that presents in a direction away from a center axis of the housing body and extends no further radially than the annular collar outer wall;
- wherein the correlated magnetic structure is provided within a tab extending in an axial direction with respect to the annular collar, said tab form-fit within said annular collar.

* * * * *

UNITED STATES PATENT AND TRADEMARK OFFICE
CERTIFICATE OF CORRECTION

| | | |
|---|---|---|
| PATENT NO. | : 11,931,679 B2 | Page 1 of 1 |
| APPLICATION NO. | : 17/318735 | |
| DATED | : March 19, 2024 | |
| INVENTOR(S) | : Robert Astle et al. | |

It is certified that error appears in the above-identified patent and that said Letters Patent is hereby corrected as shown below:

In the Specification

Column 2, Line 39, insert --A-- after "FIG 2"

Column 7, Line 64, insert --30-- after "FIG."

Column 8, Line 52, change "on" to --in-- after "illustrated"

Column 11, Line 27, insert --30-- after "cartridge"

Signed and Sealed this
Sixth Day of May, 2025

Coke Morgan Stewart
*Acting Director of the United States Patent and Trademark Office*